United States Patent
Kim et al.

(10) Patent No.: US 9,654,728 B2
(45) Date of Patent: *May 16, 2017

(54) SYSTEM AND METHOD FOR PROVIDING IMAGE

(71) Applicant: SAMSUNG ELECTRONICS CO., LTD., Suwon-si (KR)

(72) Inventors: Yong-tae Kim, Suwon-si (KR); Hae-young Jun, Hwaseong-si (KR); Youn-gun Jung, Yongin-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 14/936,188

(22) Filed: Nov. 9, 2015

(65) Prior Publication Data

US 2016/0065893 A1 Mar. 3, 2016

Related U.S. Application Data

(63) Continuation of application No. 13/944,279, filed on Jul. 17, 2013, now Pat. No. 9,204,090.

(30) Foreign Application Priority Data

Jul. 17, 2012 (KR) .......................... 10-2012-0077919
Jul. 10, 2013 (KR) .......................... 10-2013-0081194

(51) Int. Cl.
*H04N 7/14* (2006.01)
*H04N 21/2343* (2011.01)
(Continued)

(52) U.S. Cl.
CPC ............ *H04N 7/147* (2013.01); *G06F 3/041* (2013.01); *H04N 21/234345* (2013.01);
(Continued)

(58) Field of Classification Search
CPC ................................ H04N 7/147; G06F 3/041
(Continued)

(56) References Cited

U.S. PATENT DOCUMENTS 5,267,331 A * 11/1993 Siwoff ............... G02B 27/2235
348/62
5,359,675 A * 10/1994 Siwoff ................. G02B 27/017
345/8
(Continued)

FOREIGN PATENT DOCUMENTS

EP 2387228 A2 11/2011
JP 2003309828 A 10/2003
(Continued)

OTHER PUBLICATIONS

Communication dated Feb. 17, 2014, issued by the European Patent Office in counterpart European Application No. 13176900.2.
(Continued)

*Primary Examiner* — Gerald Gauthier
(74) *Attorney, Agent, or Firm* — Sughrue Mion, PLLC

(57) ABSTRACT

A system and method for providing an image are provided. The image providing method includes: transmitting, to an external device, a first video image of a first resolution, which is converted from an original video image of an original resolution; receiving, from the external device, area information about an area of interest of the first video image of the first resolution; determining, based on the area information, an area corresponding to the area of interest, of the original video image of the original resolution, wherein the determined area is smaller than the original video image of the original resolution converting a part of the original video image of the original resolution to a second video image of
(Continued)

the first resolution, wherein the part corresponds to the determined area; and transmitting the second video image to the external device.

18 Claims, 18 Drawing Sheets

(51) Int. Cl.
H04N 21/422 (2011.01)
H04N 21/4728 (2011.01)
G06F 3/041 (2006.01)

(52) U.S. Cl.
CPC ............. H04N 21/234363 (2013.01); H04N 21/42224 (2013.01); H04N 21/4728 (2013.01)

(58) Field of Classification Search
USPC .............. 345/1.3; 348/14.01, 14.03, 51, 143, 348/333.12, 553, 376; 361/814; 375/240.11; 382/232, 114, 245, 274; 455/566, 575.5, 461; 715/206, 810; 725/37, 105, 116; 209/584; 340/435
See application file for complete search history.

(56) References Cited

U.S. PATENT DOCUMENTS

| 5,726,670 | A | 3/1998 | Tabata et al. |
| 5,914,747 | A | 6/1999 | Hamilton |
| 6,178,204 | B1 | 1/2001 | Hazra |
| 6,388,638 | B2 | 5/2002 | Fukushima et al. |
| 6,701,017 | B1* | 3/2004 | Nagata ............... H04N 7/24 348/265 |
| 6,956,616 | B2* | 10/2005 | Jung ............... G02B 25/02 348/370 |
| 7,333,071 | B2* | 2/2008 | Baudisch ............ G06F 3/1438 345/1.1 |
| 7,702,015 | B2* | 4/2010 | Richter ............... H04N 5/77 348/121 |
| 7,760,908 | B2 | 7/2010 | Curtner et al. |
| 7,821,575 | B2* | 10/2010 | Yamada ............... G09G 5/14 348/553 |
| 8,090,423 | B2* | 1/2012 | Na .................. H01Q 1/243 455/117 |
| 8,094,464 | B2* | 1/2012 | Choi ............... H05K 1/147 361/679.01 |
| 8,203,640 | B2* | 6/2012 | Kim ............... G03B 29/00 345/173 |
| 8,208,758 | B2 | 6/2012 | Wang et al. |
| 8,265,426 | B2 | 9/2012 | Terada et al. |
| 8,289,371 | B2 | 10/2012 | Wagner et al. |
| 8,315,466 | B2 | 11/2012 | El-Maleh et al. |
| 8,331,451 | B2 | 12/2012 | Bang et al. |
| 8,432,430 | B2* | 4/2013 | Jun .................. H04N 5/247 348/14.01 |
| 8,432,492 | B2 | 4/2013 | Deigmoeller et al. |
| 8,467,833 | B2* | 6/2013 | Cho ................. G06F 1/1624 455/550.1 |
| 8,549,571 | B2* | 10/2013 | Loher ............... H04N 7/183 348/211.3 |
| 8,587,655 | B2* | 11/2013 | Garoutte .......... G08B 13/19608 348/143 |
| 8,648,877 | B2 | 2/2014 | Kim |
| 8,693,774 | B2 | 4/2014 | Huang |
| 8,723,930 | B2* | 5/2014 | Lim ................. H04N 5/2355 348/42 |
| 8,766,983 | B2 | 7/2014 | Marks et al. |
| 8,786,660 | B2* | 7/2014 | Lyu ................ H04N 7/147 348/14.01 |
| 8,803,995 | B2 | 8/2014 | Alvarez et al. |
| 8,881,218 | B2* | 11/2014 | Andrews .......... H04N 21/23436 725/116 |
| 8,949,904 | B2 | 2/2015 | Kim et al. |
| 8,984,389 | B2* | 3/2015 | Cho ................. G06F 3/0481 715/206 |
| 8,984,552 | B2* | 3/2015 | Shaw ............... H04N 21/23439 725/135 |
| 9,204,090 | B2* | 12/2015 | Kim ................. H04N 7/147 |
| 2002/0093531 | A1 | 7/2002 | Barile |
| 2005/0206510 | A1* | 9/2005 | Weber .............. B60R 1/00 340/435 |
| 2006/0034533 | A1* | 2/2006 | Batchvarov ......... G06T 3/4053 382/245 |
| 2006/0114987 | A1 | 6/2006 | Roman |
| 2006/0139371 | A1 | 6/2006 | Lavine et al. |
| 2006/0215753 | A1 | 9/2006 | Lee et al. |
| 2007/0229680 | A1 | 10/2007 | Kinney |
| 2007/0243887 | A1* | 10/2007 | Bandhole ............ H04M 3/493 455/461 |
| 2009/0027496 | A1 | 1/2009 | Anegawa et al. |
| 2009/0037477 | A1* | 2/2009 | Choi ................. G06F 17/30259 |
| 2009/0114575 | A1* | 5/2009 | Carpenter ............ B07C 7/005 209/584 |
| 2010/0020233 | A1 | 1/2010 | Ueno et al. |
| 2010/0149301 | A1 | 6/2010 | Lee et al. |
| 2010/0192106 | A1 | 7/2010 | Watanabe et al. |
| 2010/0299634 | A1* | 11/2010 | Cho ................. G06F 3/0482 715/810 |
| 2010/0305844 | A1 | 12/2010 | Choi et al. |
| 2010/0321485 | A1 | 12/2010 | Pool |
| 2011/0096228 | A1 | 4/2011 | Deigmoeller et al. |
| 2012/0121187 | A1 | 5/2012 | Lee et al. |
| 2012/0169871 | A1* | 7/2012 | Sablak .............. H04N 7/18 348/143 |
| 2012/0268605 | A1 | 10/2012 | Sakamoto |
| 2012/0281069 | A1 | 11/2012 | Nishio |
| 2013/0083187 | A1 | 4/2013 | Xie et al. |
| 2013/0106988 | A1 | 5/2013 | Davis et al. |
| 2013/0222591 | A1 | 8/2013 | Alves |
| 2014/0022329 | A1* | 1/2014 | Kim ................. H04N 7/147 348/14.03 |
| 2016/0065893 | A1* | 3/2016 | Kim ................. H04N 7/147 348/14.03 |

FOREIGN PATENT DOCUMENTS

| JP | 2011135248 A | 7/2011 |
| KR | 1020100059681 A | 6/2010 |
| KR | 1020110068057 A | 6/2011 |
| KR | 10-1077029 B1 | 10/2011 |
| KR | 1020110116116 A | 10/2011 |
| TW | 201142642 A1 | 12/2011 |
| TW | 201225654 A1 | 6/2012 |

OTHER PUBLICATIONS

International Search Report (IPCT/ISA/210) dated Oct. 28, 2013 from the International Searching Authority in counterpart Application No. PCT/KR2013/006257.

Written Opinion (IPCT/ISA/237) dated Oct. 28, 2013 from the International Searching Authority in counterpart Application No. PCT/KR2013/006257.

Research and Development Laboratories of KDDI Corporation "Developing a video streaming techniques that enables a portion of an image to be freely enlarged and reproduced" Nov. 16, 2010,4 pages.

Communication issued Sep. 21, 2016, issued by the Taiwan Intellectual Property Office in counterpart Taiwanese Patent Application No. 102125571.

* cited by examiner

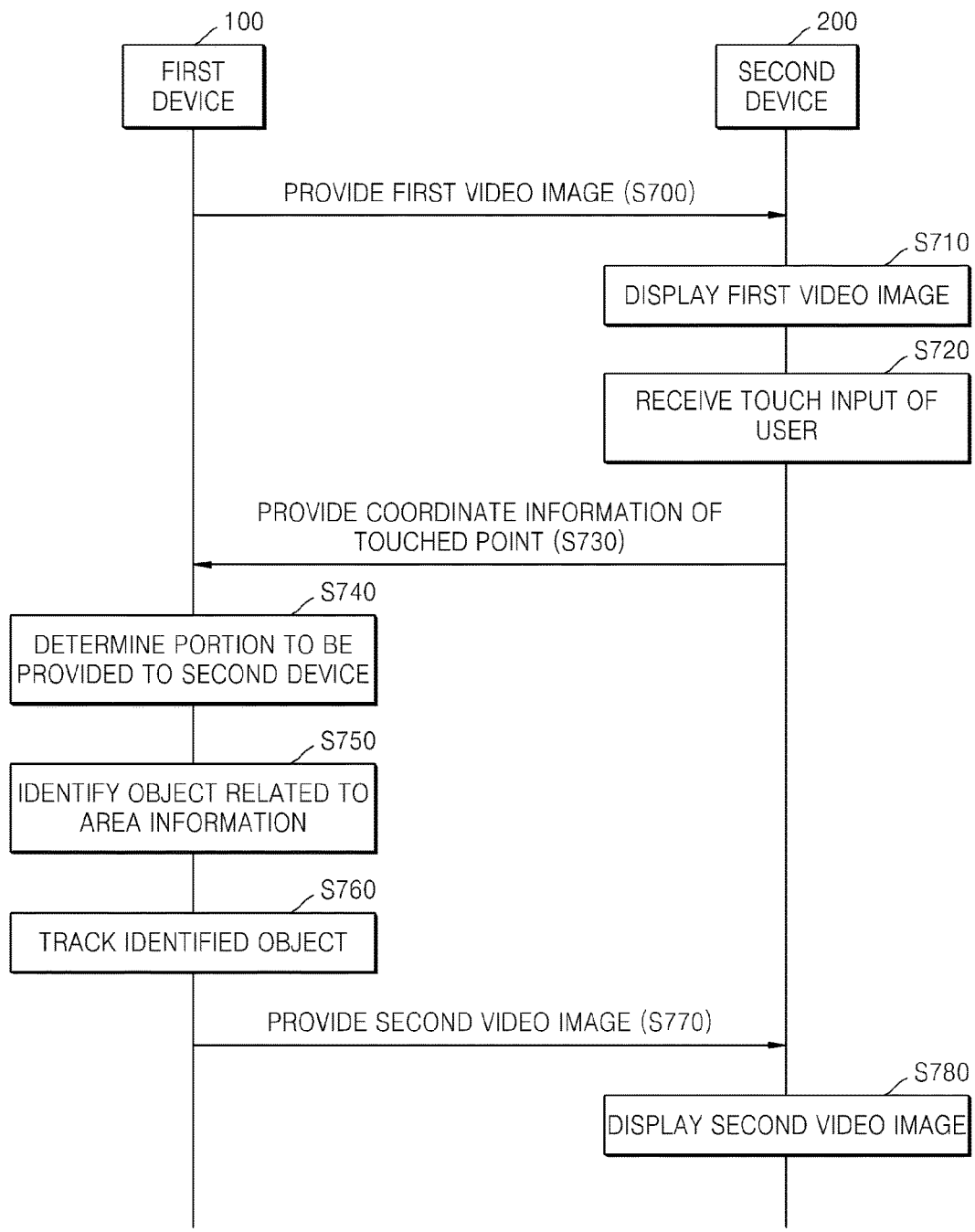

FIG. 8A
FIG. 8B
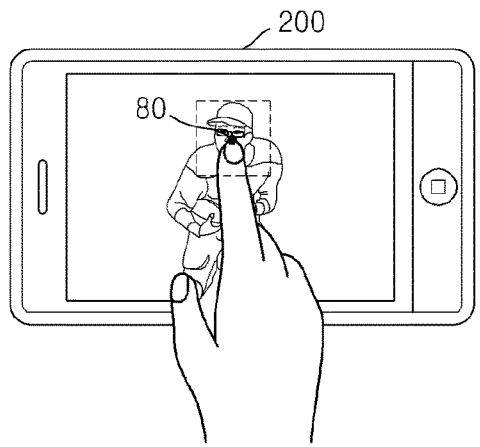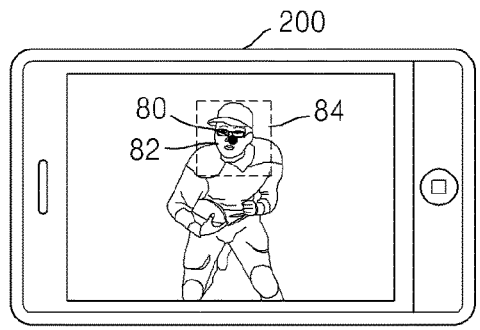
FIG. 9A
FIG. 9B
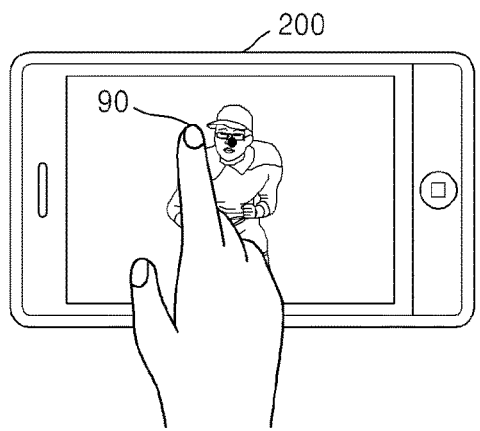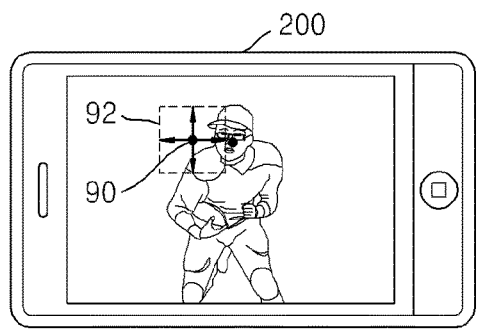
FIG. 10A
FIG. 10B
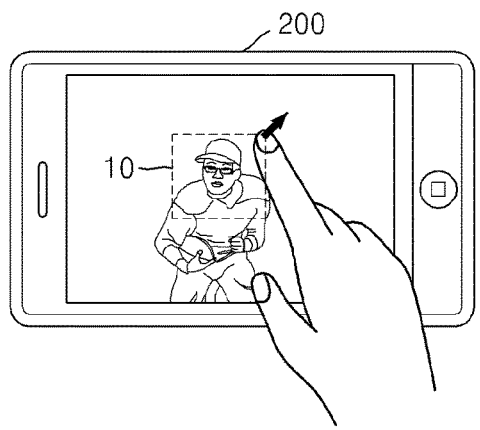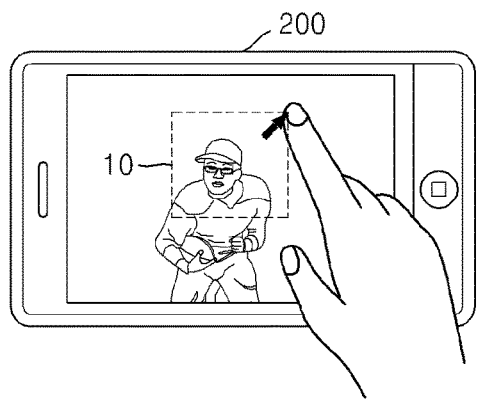

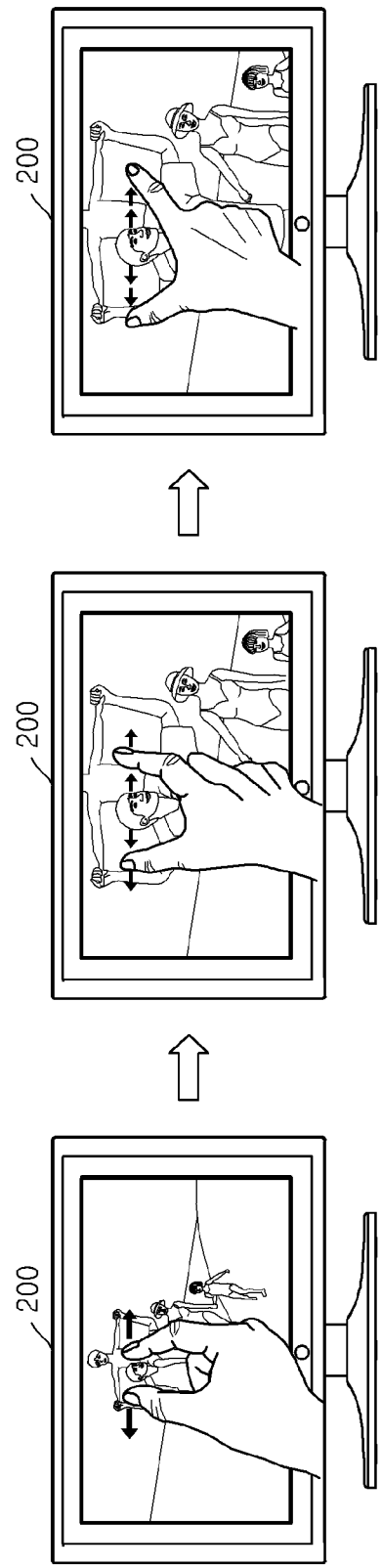

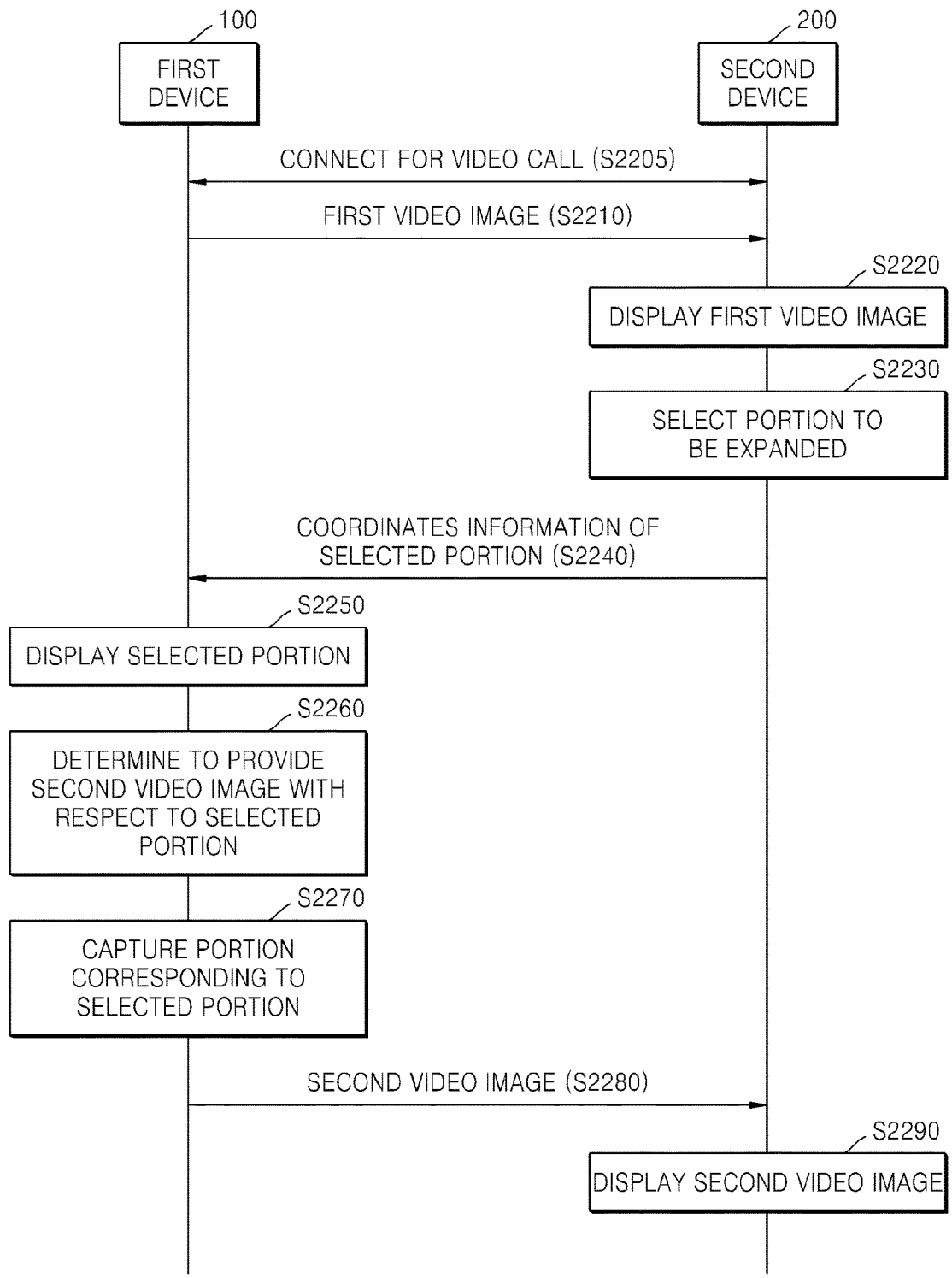

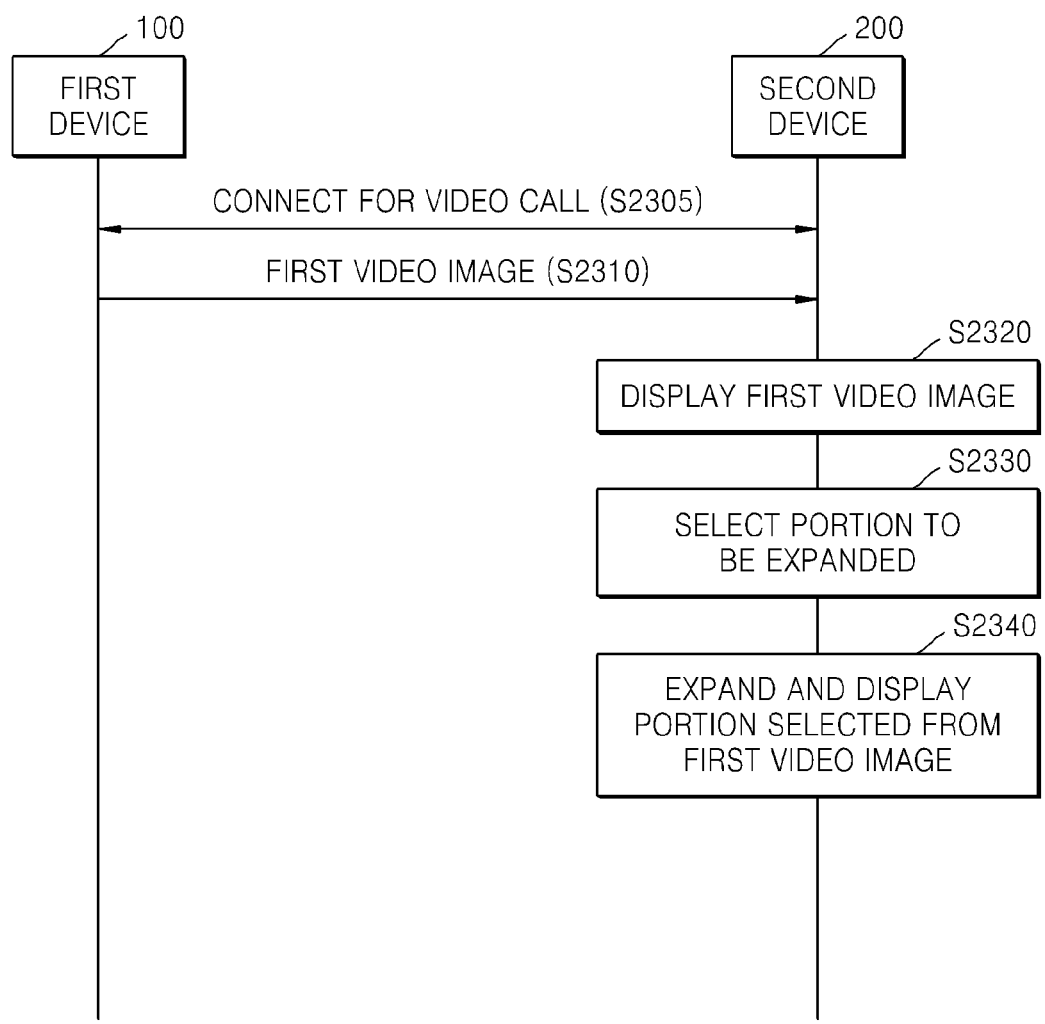

SYSTEM AND METHOD FOR PROVIDING IMAGE

CROSS-REFERENCE TO RELATED PATENT APPLICATION

This application is a continuation of U.S. application Ser. No. 13/944,279 which was filed on Jul. 17, 2013, which claims the benefit of Korean Patent Application No. 10-2012-0077919, filed on Jul. 17, 2012, and Korean Patent Application No. 10-2013-0081194, filed on Jul. 10, 2013, in the Korean Intellectual Property Office, the disclosures of which are incorporated herein in their entirety by reference.

BACKGROUND

1. Field

Exemplary embodiments relate to a system and method for providing an image including an object corresponding to a portion of an image captured by using a device, to another device.

2. Description of the Related Art

Recently, the technique of transmitting and receiving images between devices having a multi-media function is being actively used. In particular, as mobile communication infrastructures are provided and devices such as smart phones, mobile phones, and personal digital assistance (PDA) devices are typically used, various services other than a voice call function are provided by these devices.

In addition, video calls performed by using the devices allow users in two different locations to make a face-to-face video call even if they may be far away from each other, and thus the use video calls is rapidly increasing.

In general, a device on the transmission side obtains a video Image of a user for a video call, encodes the obtained image according to a predetermined video encoding format, and transmits the encoded video image as encoded video data to the opposite device.

In addition, a device on the reception side receives the encoded video data through a mobile communication network, and decodes and displays the same on a display embedded in the device on the reception side, for example, a liquid crystal display (LCD). Accordingly, the user on the reception side may make a phone call by viewing the image captured by using the device on the transmission side, in real-time.

However, display devices included in the devices have various resolutions, and as streaming resolutions of data transmitted between the devices are different according to communication methods, a technique of effectively providing a portion of a captured video image by using the device on the transmission side to the device on the reception side is required. Moreover, when making a video call, there is a demand for technique of effectively selecting and expanding a portion of an image captured by using the device on the transmission side and providing the portion to a user.

SUMMARY

Exemplary embodiments relate to a system and method for providing an image whereby a device may track an object included in an image being captured and transmit a portion of the image including the tracked object to another device.

According to an aspect of an exemplary embodiment, there is provided an image providing method, including: transmitting, to an external device, a first video image of a first resolution, which is converted from an original video image of an original resolution; receiving, from the external device, area information about an area of interest of the first video image of the first resolution which is displayed on a screen of the external device; determining, based on the area information, an area, corresponding to the area of interest, of the original video image of the original resolution, wherein the determined area is smaller than the original video image of the original resolution; converting a part of the original video image of the original resolution to a second video image of the first resolution, wherein the part corresponds to the determined area; and transmitting the second video image to the external device.

The area of interest may include an object displayed in the first video image, and the area information may be generated by the external device.

When the screen of the external device is touched, the area of interest may be selected so as to include the object corresponding to the touched point of the screen.

When the screen of the external device is touched, the area of interest including a previously set range around the touched point of the screen may be selected.

In the receiving of the area information, when the screen of the external device is touched, coordinate information of the touched point of the screen may be received from the external device.

When the screen of the external device is touched, a user interface for selecting the area of interest may be displayed on the screen of the external device.

The first video image and the second video image may be video images for a video call with the external device, and in the transmitting the first video image to the external device, the first video image may be transmitted to the external device based on a captured video image, and a resolution of the captured video image may be greater than a streaming resolution of the video call.

A range of the area of interest may be determined according to a type of a communication method used to communicate with the external device.

The first resolution may be determined according to a type of a communication method used to communicate with the external device.

The image providing method may further include modifying the first resolution according to modification of a communication method used to communicate with the external device.

The image providing method may further include modifying the determined area according to a modification of a communication method used to communicate with the external device.

In the transmitting the first video image to the external device, the first video image and the second video image may be transmitted to the external device based on a captured video image, wherein the method further includes modifying the determined area when an object included in the area of interest disappears from the captured video image.

The image providing method may further include, when the object that disappeared from the captured video image reappears in the captured video image, providing, to the external device, the second video image of only a portion including the object that reappears.

Notification information notifying that the second video image is transmitted may be inserted into the second video image.

The notification information may be inserted into a header of a packet corresponding to a previously set frame of the second video image.

The packet may be a real-time transfer protocol (RTP) packet, and an RTP marker field value of the RTP packet may be 1.

The packet may be an RTP packet, and the notification information may be inserted into a header extension field of the RTP packet.

The notification information may include area information indicating a portion of the first video image that corresponds to the second video image.

The area of interest may be an area designated based on a user input on the screen of the external device displaying the first video image.

According to aspect of another exemplary embodiment, there is provided an image receiving method, by using a device, including: receiving a first video image from an external device; providing, to the external device, area information about an object included in the received first video image; and receiving, from the external device, a second video image including only a portion of the first video image, wherein the portion includes the object, wherein a resolution of the second video image is greater than a resolution of the portion of the first video image, and the portion of the first video image including the object is determined by the external device based on the provided area information.

The image receiving method may further include: selecting, based on a user input, an area of interest related to the object included in the received first video image; and generating area information about the selected area of interest.

In the selecting the area of interest, when a screen of the device displaying the first video image is touched, the area of interest may be selected so as to include the object included in the received first video image, wherein the object includes the touched point of the screen.

In the selecting the area of interest, when a screen of the device displaying the first video image is touched, an area of a previously set range around the touched point of the screen may be selected.

In the providing the area information, when a screen of the device displaying the first video image is touched, coordinate information of the touched point of the screen may be provided to the external device.

The image receiving method may further include, when a screen of the device displaying the first video image is touched, displaying a user interface for selecting the area of interest.

The first video image and the second video image may be video images for a video call with the external device, and the first video image and the second video image may be provided by the external device based on a video image captured by the external device, and a resolution of the captured video image may be greater than a streaming resolution of the video call.

A range of the area of interest may be determined by the device, according to a type of a communication method used to communicate with the external device.

A resolution of at least one of the first video image and the second video image may be determined by the external device, according to a type of a communication method used to communicate with the external device.

A resolution of at least one of the first video image and the second video image may be modified by the external device, according to modification of a communication method used to communicate with the external device.

The portion may be modified by using the external device, according to modification of a communication method used to communicate with the external device.

The first video image and the second video image may be provided by the external device based on a video image captured by using the external device, and when the object, which is present in the captured image, disappears from the captured video image, the portion of the first video image may be modified, wherein the image receiving method further includes: receiving, from the external device, the second video image including only the modified portion.

The image receiving method may further include, when the object that disappeared from the captured video image reappears in the captured video image, receiving, from the external device, the second video image including only a portion including the reappeared object.

According to an aspect of another exemplary embodiment, there is provided a device including: a memory configured to store at least one program; and a processor configured to provide a captured video image to an external device by executing the at least one program, wherein the at least one program includes commands to transmit a first video image to the external device; receive, from the external device, area information corresponding to an object included in the first video image; and provide, based on the area information, a second video image including only a portion of the first video image that includes the object, and wherein a resolution of the second video image is greater than a resolution of the portion of the first video image.

The area information may be information about an area of interest selected by the external device and is generated by the external device.

When a screen of the external device displaying the first video image is touched, the area of interest that includes the object including the touched point of the screen may be selected.

When the screen of the external device displaying the first video image is touched, the area of interest of a previously set range around the touched point of the screen may be selected.

In the receiving of area information, when the screen of the external device displaying the first video image is touched, coordinate information of the touched point of the external device may be received from the external device.

When the screen of the external device is touched, a user interface for selecting the area of interest may be displayed on the screen of the external device.

The first video image and the second video image may be video images for a video call with the external device, and in the transmitting the first video image to the external device, the first video image may be transmitted to the external device based on the captured video image, and a resolution of the captured video image may be greater than a streaming resolution of the video call.

A range of the area of interest may be determined by the external device according to a type of a communication method used to communicate with the external device.

A resolution of at least one of the first video image and the second video image may be determined according to a type of a communication method used to communicate with the external device.

The device may further include commands to execute modifying a resolution of at least one of the first video image and the second video image according to modification of a communication method used to communicate with the external device.

The device may further include commands to execute: modifying the portion according to modification of a communication method used to communicate with the external device; and providing the second video image of the modified portion, to the external device.

In the transmitting the first video image to the external device, the first video image and the second video image may be transmitted to the external device based on the captured video image, wherein the device further includes commands to execute: modifying the portion when the object disappears from the captured video image; and providing the second video image of the modified portion to the external device.

The device may further include commands to execute, when the object that disappeared from the captured video image reappears in the captured video image, providing, to the external device, the second video image of only a portion including the object that reappears.

According to an aspect of another exemplary embodiment, there is provided a device including: a memory configured to store at least one program; and a processor configured to provide a captured video image to an external device by executing the at least one program, wherein the at least one program includes commands to receive a first video image from the external device; provide, to the external device, area information about an object included in the received first video image; and receive, from the external device, a second video image including only a portion of the first video image, wherein the portion of the first video image includes the object, wherein a resolution of the second video image is greater than a resolution of the portion of the first video image, and wherein the portion of the first video image including the object is determined based on the provided area information According to an aspect of another exemplary embodiment, there is provided an image providing method, including: transmitting, to an external device, a first video image having a plurality of first frames; receiving, from the external device, area information related to an object included in the first video image; selecting, based on the area information, a first frame including the object from among the plurality of first frames; and transmitting a second video image including a plurality of second frames that include only a portion of the selected first frame, to the external device.

According to an aspect of another exemplary embodiment, there is provided an image providing method, including: transmitting, to an external device, a first video image having a plurality of first frames; receiving, from the external device, area information related to an object included in the first video image; selecting, based on the area information, portions that includes the object from the plurality of first frames; and transmitting a second video image including a plurality of second frames that include only the selected portions, to the external device.

According to an aspect of another exemplary embodiment, there is provided an image providing method, including: transmitting, to an external device, a first image of a first resolution corresponding to an execution screen of an application; receiving area information about an area of interest of the first image displayed on a screen of the external device, from the external device; determining, based on the area information, a portion of the first image corresponding to the area of interest, wherein the portion is smaller than the first image; converting the first image to a second image based on the determined portion; and transmitting the second image to the external device at the first resolution.

According to an aspect of another exemplary embodiment, there is provided an image providing method, including: transmitting, to an external device, a first video image; receiving, from the external device, area information about an area of the first video image; generating a second video image based on the area information; and transmitting, to the external device, the second video image.

A resolution of the second video image may be greater than a resolution of the area of the first video image.

The second video image may include an object displayed in the area of the first video image.

The second video image may include a video of a previously set range around the area of the first video image.

According to an aspect of another exemplary embodiment, there is provided an image receiving method, by using a device, including: receiving a first video image from an external device; providing, to the external device, area information about an area of the first video image; and receiving, from the external device, a second video image including only a portion of the first video image corresponding to the area information.

A resolution of the second video image may be greater than a resolution of the area of the first video image.

The portion of the first video image may be an area of a previously set range around the area of the first video image.

The area information may include coordinate information of the area of the first video image.

The method may further include displaying a user interface for selecting the area of the first video image.

BRIEF DESCRIPTION OF THE DRAWINGS

The above and other features and advantages will become more apparent by describing in detail exemplary embodiments with reference to the attached drawings in which:

FIG. 7 is a flowchart illustrating a method of providing a video image including an object corresponding to a portion of a video image being captured by using a first device, to a second device, according to another exemplary embodiment;

FIGS. 8A and 8B illustrate an example of determining a portion of a first video image as an area of interest, by using a second device, such that an object including a touch point touched by a user is included in the determined portion, according to an exemplary embodiment;

FIGS. 9A and 9B illustrate an example of determining, as an area of interest, a portion within a previously set range from a touch point of a user, by using a second device, according to an exemplary embodiment;

FIGS. 10A and 10B illustrate an example of determining a portion of a first video image as an area of interest by using a second device via a user interface for determining a portion of the first video image, according to an exemplary embodiment;

FIGS. 17A through 17C illustrate an example of expanding a portion of a first video image displayed on a screen of a second device according to an exemplary embodiment;

FIG. 22 is a flowchart illustrating a method of receiving, by a second device that is making a video call with a first device, a second video image which is an expanded portion of the first video image, according to an exemplary embodiment.

FIG. 23 is a flowchart illustrating a method of expanding a portion of a first video image and displaying the same, by a second device that is making a video call with a first device, according to an exemplary embodiment.

DETAILED DESCRIPTION OF EXEMPLARY EMBODIMENTS

Figure 1:
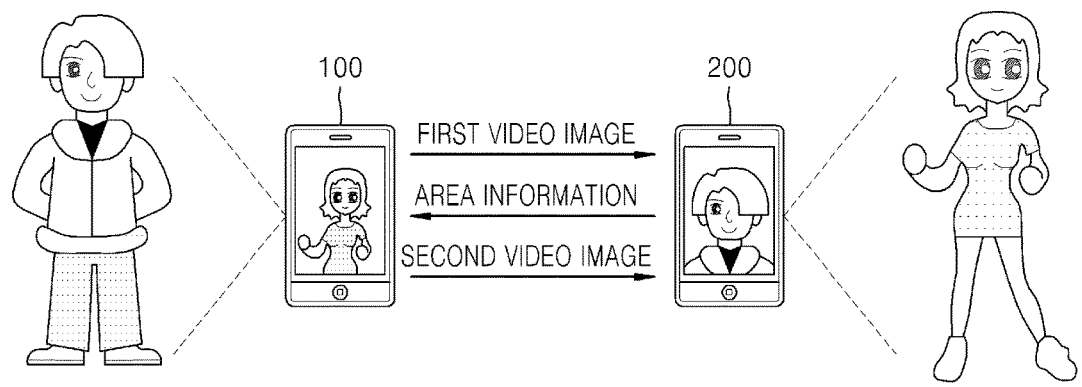
FIG. 1 is a schematic view of an image providing system according to an exemplary embodiment.

The attached drawings for illustrating exemplary embodiments are referred to in order to gain a sufficient understanding of the exemplary embodiments. Hereinafter, the exemplary embodiments will be described in detail with reference to the attached drawings. Like reference numerals in the drawings denote like elements. In the present specification, when a constituent element "connects" or is "connected" to another constituent element, the constituent element contacts or is connected to the other constituent element not only directly but also electrically through at least one of other constituent elements interposed therebetween. Also, when a part may "include" a certain constituent element, unless specified otherwise, it may not be construed to exclude another constituent element but may be construed to further include other constituent elements.

Expressions such as "at least one of," when preceding a list of elements, modify the entire list of elements and do not modify the individual elements of the list.

FIG. 1 is a schematic view of an image providing system according to an exemplary embodiment.

Referring to FIG. 1, a first device 100 and a second device 200 may be able to make a video call with each other, and the first device 100 may provide a video image that is being captured by using the first device 100, to the second device 200. Also, the second device 200 may provide a video image that is being captured by using the second device 200, to the first device 100.

Hereinafter, an embodiment in which the first device 100 provides a video image to the second device 200 in the image providing system according to the current exemplary embodiment will be described for convenience of description. Also, a video image captured by using the first device 100 is described as contents provided by the first device 100 to the second device 200, but the contents are not limited thereto, and examples of contents that the first device 100 may provide to the second device 200 include a video image, a photographic image, a capture image, and an application execution image.

The first device 100 may provide a first video image to the second device 200 based on a video image captured by using the first device 100, and receive area information about an object included in the first video image, from the second device 200. Also, the first device 100 may track a predetermined object included in the first video image based on the received area information, and provide a second video image including only a portion of the first video image including the tracked object, to the second device 200.

When a resolution of a video image being captured by using the first device 100 is greater than a streaming resolution of a video image transmitted between the first device 100 and the second device 200, the first device 100 may provide a second video image regarding a portion of the video image being captured, to the second device 200.

The first device 100 and the second device 200 are devices capable of transmitting video images, images or the like to another device, and examples of the first and second devices 100 and 200 include a smart phone, a mobile phone, a personal digital assistant (PDA), a laptop computer, a media player, a global positioning system (GPS) device, other mobile computing devices, and other non-mobile computing devices. However, the first and second devices 100 and 200 are not limited thereto.

At least three devices may make a video phone call with one another at the same time. For example, the first device 100, the second device 200, and a third device (not shown) may make a video call together. In this case, the first device 100 may provide a first video image to the second device 200 and the third device (not shown). Also, when the second device 200 selects a portion of the first video image, the first device 100 may provide a video image related to the selected portion to the second device 200 and the third device (not shown). If the second device 200 and the third device (not shown) respectively select a portion of the first video image, the first device 100 may provide a video image regarding the portion selected by the second device 200 to the second device 200 and another video image regarding the portion selected by the third device (not shown) to the third device (not shown).

The first device 100 may provide a third video image corresponding to an execution screen of an application executed in the first device 100, to the second device 200. In this case, the second device 200 may select a portion of the received third video image, and receive a fourth video image regarding the selected portion, from the first device 100.

Figure 2A:
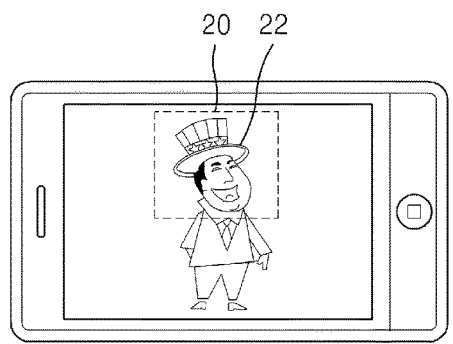
FIGS. 2A and 2B illustrate an image including an object corresponding to a portion of an image captured by using a first device, being displayed on a second device, according to an exemplary embodiment.
Figure 2B:
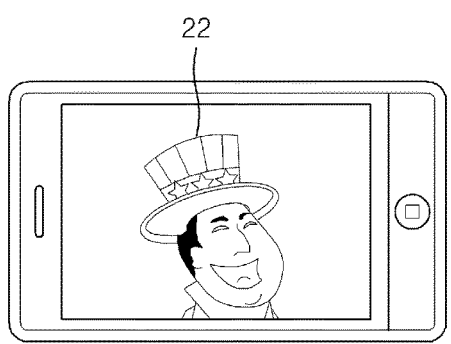

FIGS. 2A and 2B illustrate an image including an object corresponding to a portion of an image captured by using a first device 100, being displayed on a second device 200, according to an exemplary embodiment. In detail, FIG. 2A illustrates a first video image according to an exemplary embodiment; and FIG. 2B illustrates a second video image according to an exemplary embodiment.

The first device 100 may provide a first video image to the second device 200 based on a video image that is currently being captured, and may check an object 22 included in the first video image. Also, the first device 100 may provide a second video image including only a portion of the first video image that includes the checked object 22, to the second device 200.

The first device 100 may check the object 22 included in a predetermined portion 20 in a video image being captured, but is not limited thereto. The first device 100 may also check the object 22 in the first video image provided to the second device 200.

Figure 3:
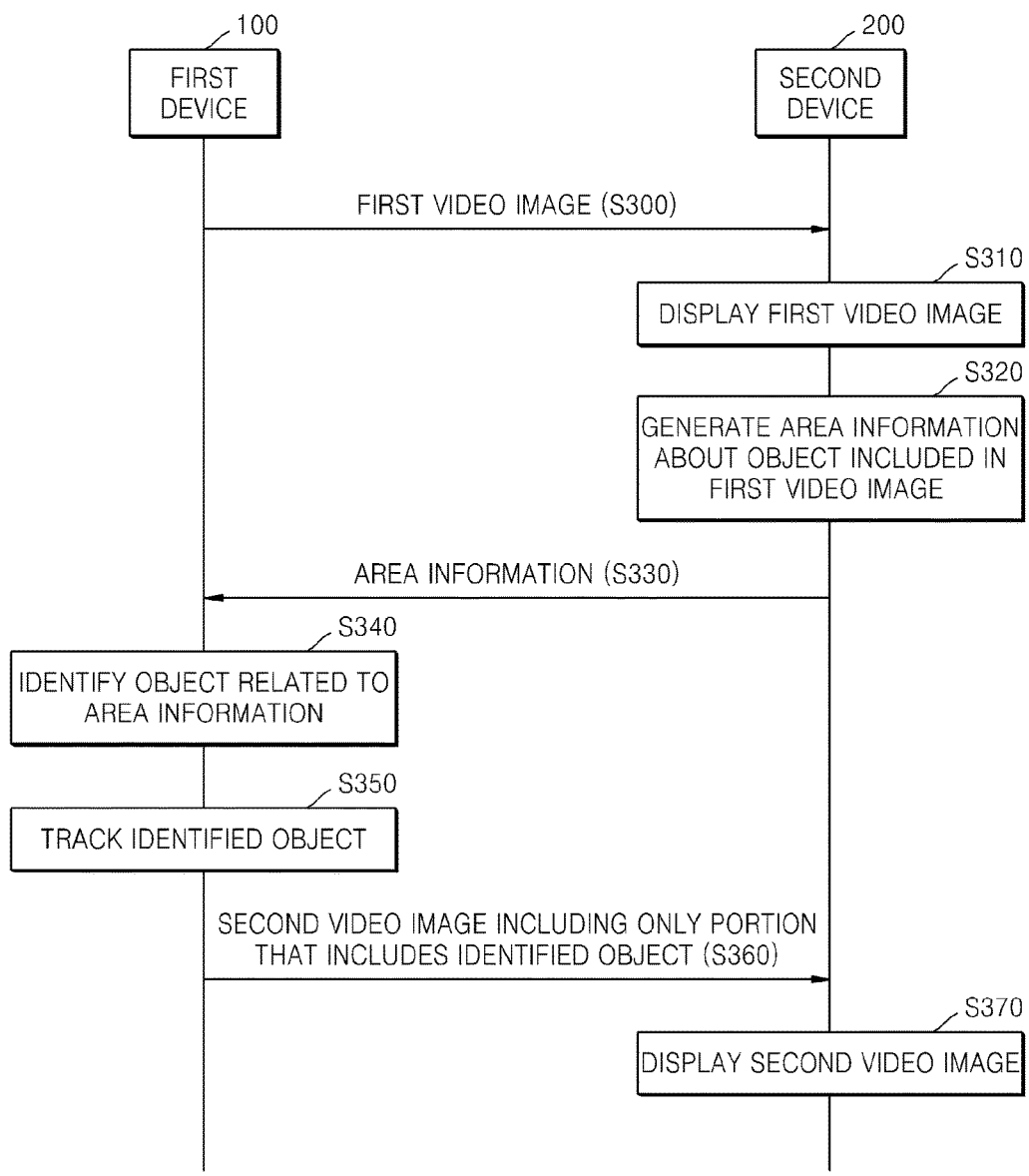
FIG. 3 is a flowchart illustrating a method of providing a video image including an object corresponding to a portion of a video image being captured by using a first device, to a second device, according to an exemplary embodiment.

FIG. 3 is a flowchart illustrating a method of providing a video image including an object corresponding to a portion of a video image being captured by using a first device 100, to a second device 200, according to an exemplary embodiment.

In operation S300, the first device 100 provides a first video image to the second device 200. The first device 100 may provide a first video image to the second device 200 based on a video image that is being captured. The first device 100 may provide the video image that is being captured, as a first video image without any additional processing, to the second device 200. Also, the first device 100 may process a video image being captured, and provide the processed video image as a first video image, to the second device 200. In this case, the first device 100 may modify a resolution or a format of a video image being captured. For example, when a resolution of a video image being captured is greater than a streaming resolution that allows for uninterrupted streaming of data transmitted between the first device 100 and the second device 200, the first device 100 modifies the resolution of the video image being captured to be the same as the streaming resolution, and may provide the first video image having a modified resolution, to the second device 200. Also, the first video image may have a plurality of first frames.

The first device 100 may transmit a first video image having an original resolution to the second device 200 at a first resolution. The first device 100 may modify the original resolution of the first video image to the first resolution, and the first device 100 may transmit the first video image having the first resolution to the second device 200. In this case, the first device 100 may obtain information about a resolution of a display included in the second device 200 in advance and store the same, and determine the first resolution based on a resolution of a display included in the second device 200.

The first device 100 may provide a third video image corresponding to an execution screen of an application executed in the first device 100, to the second device 200. The first device 100 may provide a third video image at a third resolution, to the second device 200.

In operation S310, the second device 200 displays the received first video image. The second device 200 may display the received first video image on a screen of the second device 200. The second device 200 may display the first video image of the first resolution on the screen of the second device 200.

Meanwhile, when the second device 200 has received a third video image corresponding to an execution screen of an application executed in the first device 100, the second device 200 may display the received third video image. The second device 200 may display a third video image of the third resolution.

In operation S320, the second device 200 generates area information about an object included in the first video image. The second device 200 may select a portion of the first video image as an area of interest, based on a user input, and may generate area information about the selected area of interest. Also, the second device 200 may select a predetermined object included in the first video image and generate area information about the selected object.

The second device 200 may receive a touch input of a user regarding the first video image, and select an area of interest based on a position of the touch input. In detail, when the user touches a predetermined point in the first video image, the second device 200 identifies an object including a touched position, and selects an area including the identified object. For example, when a face is touched on the touched position of the first video image, the second device 200 may identify the face, which is an object included in the touched position. Also, the second device 200 may select an area including the identified face, as an area of interest.

When the user touches a predetermined point on the first video image, the second device 200 may select an area of a previously set range from the touched point, as an area of interest. For example, the second device 200 may select a predetermined rectangular area around the touched point, as an area of interest.

The second device 200 may display a user interface on a screen for a user to select a portion of the first video image, as an area of interest. For example, the second device 200 may display a rectangle on a portion of the first video image, and provide a user interface so that the user may modify the size of the rectangle by touching and dragging a frame of the rectangle.

While the second device 200 selects a portion of the first video image as an area of interest based on a user input, the exemplary embodiments are not limited thereto. The second device 200 may recognize a face included in the first video image without any additional user input and select a predetermined area including the face, as an area of interest.

A size of the selected area of interest in the first video image may be determined based on a streaming resolution of data transmitted between the first device 100 and the second device 200. An upper limit of a surface area of interest in the first video image may be determined based on the streaming resolution of the data transmitted between the first device 100 and the second device 200.

The second device 200 may generate coordinate information of the selected area of interest. The second device 200 may generate a coordinate value indicating a position of the selected area of interest from among coordinates of the entire first video image. Also, the second device 200 may generate a coordinate value indicating a position of a touch input point from the entire first video image.

The second device 200 may generate area information about an area of interest of each of a plurality of first frames included in the first video image.

When a third video image corresponding to an execution screen of an application executed in the first device 100 is provided to the second device 200, the second device 200 may select a portion of the third video image and generate area information about the selected portion.

In operation S330, the second device 200 provides the generated area information about the area of interest, to the first device 100. The second device 200 may provide a coordinate value of the selected area of interest, to the first device 100. Also, the second device 200 may provide a coordinate value of a touch input point input by the user, to the first device 100.

In operation S340, the first device 100 identifies an object related to area information. In operation S340, the first device 100 may identify an object in the first video image based on the received area information. For example, when an object included in the first video image corresponding to the received area information is a face, the first device 100 may identify a face from the first video image. Also, an object related to the received area information may be identified from each of a plurality of first frames included in the first video image.

The first device 100 may identify an object from a video image being captured, based on the received area information. The received area information is area information about a portion of the first video image, and thus, the first device 100 may check a portion corresponding to the portion of the first video image corresponding to the received area information, from the video image being captured. Also, the first device 100 may identify an object included in the corresponding portion from the video image being captured.

The first device 100 may identify an object included in a video image being captured, by using the object identified from the first video image. The first device 100 may identify an object that is similar to an image of the object identified from the first video image, from the video image being captured. Whether objects are similar or not may be determined in various manners. For example, the first device 100 may determine whether objects are similar or not by comparing at least one of a size, a color, and a form of an object. Alternatively, the first device 100 may compare portions of the various objects with one another to determine whether the objects are similar.

If the first device 100 receives area information of a portion of the third video image corresponding to an execution screen of an application executed in the first device 100, from the second device 200, the first device 100 may identify an object from a third video image based on the received area information.

In operation S350, the first device 100 tracks the identified object. The first device 100 may track the object identified from the first video image. Also, the first device 100 may track an object identified from a video image captured by using the first device 100. The video image captured by using the first device 100 includes a video image that is currently being captured by using the first device 100. The identified object may move or rotate within the video image, and the first device 100 may track an object within a video image based on the form and color of the object. Tracking an identified object means, in the case when the object moves, checking a position of the moving object within a video image and checking an area in which the object is included, but tracking is not limited thereto.

In operation S350, the first device 100 may select a frame including an identified object from among a plurality of first frames of the first video image. Also, the first device 100 may identify a portion including the identified object from among a plurality of first frames of the first video image.

When the first device 100 receives area information of a portion of the third video image corresponding to an execution screen of an application executed in the first device 100, from the second device 200, the first device 100 may track an object in the third video image.

In operation S360, the first device 100 provides a second video image including only a portion including the identified object, to the second device 200. The first device 100 may cut out a portion including the identified object from the captured video image, and provide the cut portion as a second video image, to the second device 200.

In detail, the first device 100 may determine an area corresponding to an area of interest in the screen of the first video image having an original resolution, based on the received area information. Also, the first device 100 may convert the first video image to a second video image such that only the determined area is included in the second video image. Also, the first device 100 may provide the second video image at a first resolution, to the second device 200. The first video image of first resolution may be converted from the first video image of the original resolution. For example, when the original resolution of the first video image is 1000×1000, and the first resolution of the second image is 100×100, the first device 100 may convert a portion of the first video image corresponding to the determined area to a second video image having a 100×100 resolution, and transmit the second video image at a 100×100 resolution, to the second device 200.

The first device 100 may distinguish a portion including an identified object, from among a plurality of first frames of the first video image, and provide a second video image including a plurality of second frames including only a portion of the plurality of first frames, to an external device.

When the first device 100 selects a frame including an identified object, from among a plurality of first frames of the first video image, the first device 100 may provide a second video image having a plurality of second frames including only a portion of the selected frame, to an external device. In this case, this portion may be an area of interest. Also, the first device 100 may cut out a portion corresponding to an area of interest according to each selected frame, thereby generating a second frame for each selected frame.

In addition, the first device 100 may determine a size of an area corresponding to a second video image according to a communication method between the first device 100 and the second device 200.

The second video image may include a plurality of second frames each including only a portion of the frame selected in operation S350 but is not limited thereto. Also, the second video image may include a plurality of second frames including only a distinguished portion in operation S350, but is not limited thereto.

The first device 100 may determine an image quality or a resolution of a second video image according to a communication method between the first device 100 and the second device 200. For example, when a resolution of a portion of a frame including an identified object is smaller than a streaming resolution of data transmitted between the first device 100 and the second device 200, the first device 100 may increase a resolution or an image quality of the portion including the identified object. In addition, for example, when a resolution of the portion of a frame including the identified object is smaller than a streaming resolution of data transmitted between the first device 100 and the second device 200, the first device 100 may increase a resolution or an image quality of the portion of the frame including the identified object.

Examples of the communication method between the first device 100 and the second device 200 include, without limitation, third generation (3G) communication, fourth generation (4G) communication, and Wireless Fidelity (Wi-Fi) communication.

When the communication method between the first device 100 and the second device 200 is modified, the first device 100 may modify a size of an area of interest corresponding to a second video image or an image quality of the second video image. The communication method between the first device 100 and the second device 200 may be modified when at least one of the first device 100 and the second device 200 performs handover.

In addition, when the identified object disappears from a captured video image, that is, when the identified object is not captured, the first device 100 may modify an area corresponding to a second video image. For example, when the identified object disappears from a captured video image, the first device 100 may provide the entire captured video image to the second device 200. Also, in this case, the first device 100 may provide the entire captured video image to the second device 200 based on an additional user input.

In addition, when the object that disappeared once again reappears in the captured image, that is, when the objected that disappeared is captured again, a video image of a portion including the appeared object from among the entire area of the captured image may be provided to the second device 200.

When the first device 100 receives area information about a portion of a third video image corresponding to an execution screen of an application executed in the first device 100, the first device 100 may provide a fourth video image including only a portion that includes an identified object, to the second device 200. In this case, the first device 100 may provide a fourth video image at a third resolution to the second device 200.

When the first device 100 receives area information about a portion of a third video image corresponding to an execution screen of an application executed in the first device 100, the first device 100 may not identify or track the object included in the third video image. In this case, the first device 100 may cut out a portion of the third video image based on the received area information, and convert the cut portion to a fourth video image and provide the fourth video image to the second device 200.

In operation S370, the second device 200 displays the received second video image. The user of the second device 200 may check a detailed video image regarding the object included in the selected portion. Also, the second device 200 may display a still screen of the received second video image.

Meanwhile, the second device 200 may display the first video image and the second video image together on the screen of the second device 200. In this case, the second device 200 may receive not only the second video image but also the first video image in operation S360. Also, the second device 200 may display the first and second video images by overlapping the second video image on the first video image. The second device 200 may overlap the second video image on a portion of the first video image where the user of the first device 100 is not displayed. In addition, the second device 200 may adjust a size of a portion where the first video image is displayed and a size of a portion where the second video image is displayed. However, the exemplary embodiments are not limited thereto, and the second device 200 may display the first and second video images on the screen of the second device 200 without overlapping the first and second video images.

While the second device 200 receiving the second video image from the first device 100 and displaying both the first and second video images has been described above, alternatively, the second device 200 may select a portion of the first video image, extract an expanded image of the selected portion from the first video image, and display the extracted expanded image on the screen of the second device 200 together with the first video image.

Figure 4:
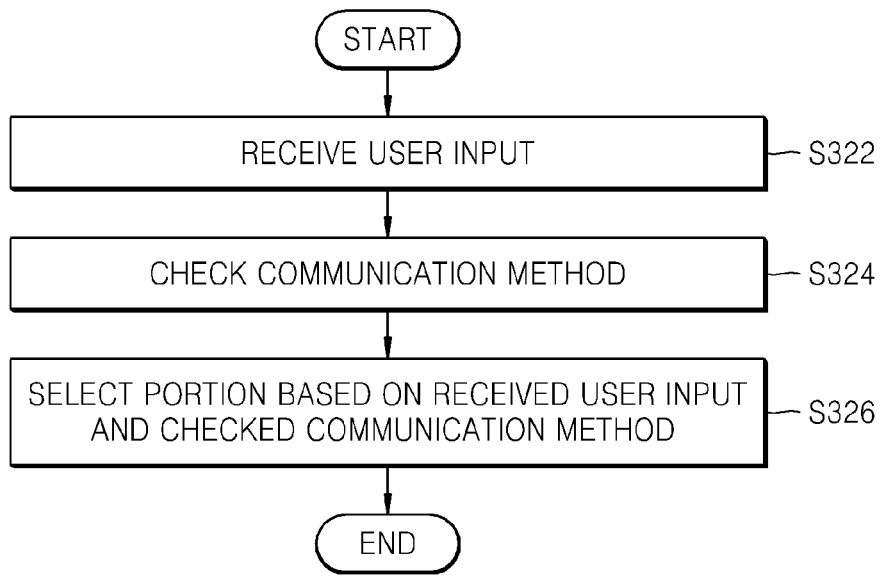
FIG. 4 is a flowchart illustrating a method of generating area information about an area of interest, by using a second device, according to an exemplary embodiment.

FIG. 4 is a flowchart illustrating a method of generating area information about an area of interest, by using a second device 200, according to an exemplary embodiment.

In operation S322, the second device 200 receives a user input for selecting a portion of the first video image. The second device 200 may receive a touch input of a user for selecting a portion of the first video image. For example, the second device 200 may receive a user input for touching a predetermined point of a first video image or a user input for touching and dragging a predetermined point of the first video image.

Also, the second device 200 may receive a touch input of a user via a predetermined user interface displayed on a screen. For example, the second device 200 may display a rectangle on a portion of the first video image, and provide a user interface so that the user may touch and drag a frame of the rectangle to modify the size of the rectangle. Also, the second device 200 may receive a touch input of a user via the provided user interface.

In operation S324, the second device 200 checks a communication method with respect to the first device 100. The second device 200 may check a type and a bandwidth of the communication method with respect to the first device 100. Also, the second device 200 may check a streaming resolution of data transmitted between the first device 100 and the second device 200. Examples of the communication method between the first device 100 and the second device 200 include, without limitation, 3G communication, 4G communication, and Wi-Fi communication.

In operation S326, the second device 200 selects a portion of the first video image as an area of interest based on the received user input and the checked communication method. The second device 200 may select a portion of the first video image based on a position of a touch input point in the first video image. In detail, when the user touches a predetermined point in the first video image, the second device 200 identifies an object including the touched point, and selects a portion of the first video image including the identified object. For example, when a displayed image of a face is touched in the first video image, the second device 200 may identify the face, which is an object including a touched point. Also, the second device 200 may select a portion including the identified face as an area of interest.

In addition, when the user touches a predetermined point in the first video image, the second device 200 may select an area of a previously set range from the touched point, as an area of interest. For example, the second device 200 may select a rectangular area having a predetermined size with respect to the touched point as an area of interest.

The second device 200 may modify the selected area of interest according to a touch input of a user via a user interface.

A size of an area of interest selected in the first video image may be determined according to a communication method between the first device 100 and the second device 200. For example, a size of an area of interest selected in the first video image may be determined based on at least one of a type and a bandwidth of a communication method. Also, in another example, a size of an area of interest selected in the first video image may be determined based on a degree of a streaming resolution of data transmitted between the first device 100 and the second device 200. An upper limit of a size of an area of interest selected in the first video image may be determined according to the communication method between the first device 100 and the second device 200.

While the second device 200 selects a portion of the first video image based on a user input according to the description with reference to FIG. 4 above, the exemplary embodiments are not limited thereto. The second device 200 may recognize a face included in the first video image without an additional user input, and select a predetermined area including the face as an area of interest. Also, in this case, a size of the selected area of interest may be determined according to a communication method between the first device 100 and the second device 200.

Figure 5:
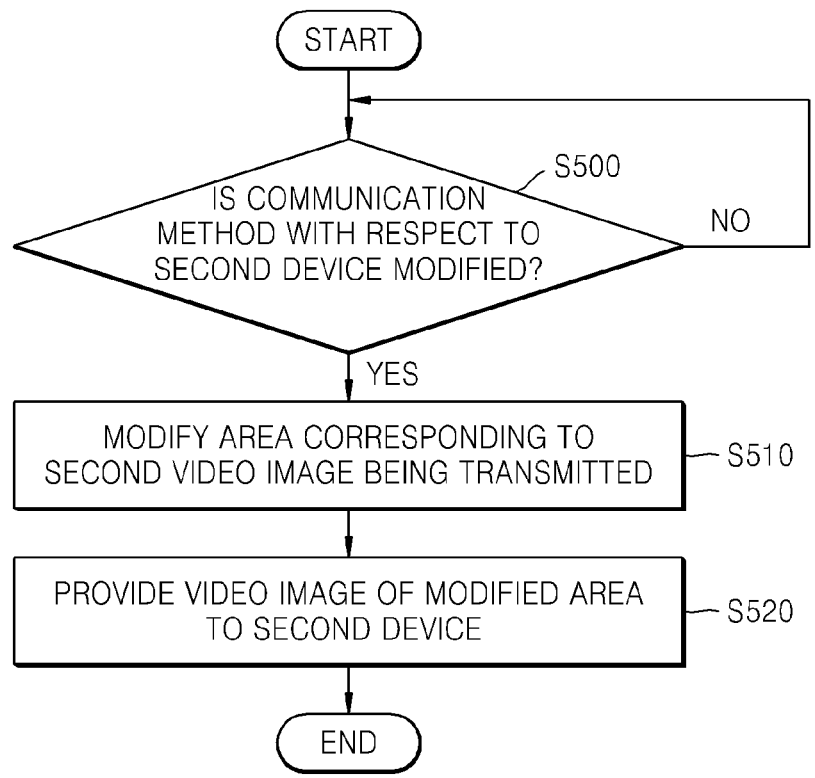
FIG. 5 is a flowchart illustrating, when a communication method between a first device and a second device is modified, a method of modifying an area of interest selected by the first device and providing a video image regarding the modified area to the second device, according to an exemplary embodiment.

FIG. 5 is a flowchart illustrating, when a communication method between a first device 100 and a second device 200 is modified, a method of modifying an area of interest selected by using the first device 100 and providing a video image regarding the modified area, to the second device 200, according to an exemplary embodiment.

In operation S500, the first device 100 determines whether a communication method between the first device 100 and the second device 200 is modified. In detail, the first device 100 may check whether a type or a bandwidth of a communication method with respect to the second device 200 is modified. Also, the second device 200 may check whether a streaming resolution of data transmitted between the first device 100 and the second device 200 is modified.

Examples of the communication method between the first device 100 and the second device 200 include, without limitation, 3G communication, 4G communication, and Wi-Fi communication. In addition, the communication method between the first device 100 and the second device 200 may be modified when at least one of the first device 100 and the second device 200 performs handover.

As a result of determination of operation S500, when a communication method is modified, in operation S510, the first device 100 modifies an area corresponding to the second video image being transmitted to the second device 200. As the communication method between the first device 100 and the second device 200 is modified, the first device 100 may modify a size of a portion of the first video image corresponding to the second video image.

For example, when the communication method between the first device 100 and the second device 200 is modified from 3G communication to Wi-Fi communication, a portion of the first video image to be transmitted from the first device that is larger than the portion of the first video image corresponding to the second video image may be selected. When the communication method between the first device 100 and the second device 200 is 3G communication and the first device 100 has transmitted a face portion of the first video image, and then the communication method between the first device 100 and the second device 200 is modified to Wi-Fi communication, the first device 100 may select a portion of the first video image such that a background portion of the first video image is further included in addition to the face. In addition, for example, when the communication method between the first device 100 and the second device 200 is modified from 4G communication to Wi-Fi communication, a smaller area than the portion corresponding to the second video image may be selected.

Also, for example, when a streaming resolution of data transmitted between the first device 100 and the second device 200 is modified, a size of the portion corresponding to the second video image may be modified.

A size of an area corresponding to at least one of a type and a bandwidth of a communication method may be set in advance and stored in the first device 100. Also, a size of an area corresponding to a streaming resolution of data transmitted between the first device 100 and the second device 200 may be set in advance and stored in the first device 100.

In operation S520, the first device 100 provides a video image of a modified area to the second device 200. For example, when the communication method between the first device 100 and the second device 200 is modified from 3G communication to Wi-Fi communication, the first device 100 may provide a video image regarding a portion of the first video image larger than the portion of the first video image corresponding to the second video image, to the second device 200. Also, for example, when a streaming resolution of data transmitted between the first device 100 and the second device 200 is reduced, the first device may provide a video image regarding a smaller portion of the first video image than the portion of the first video image corresponding to the second video image, to the second device 200.

Figure 6:
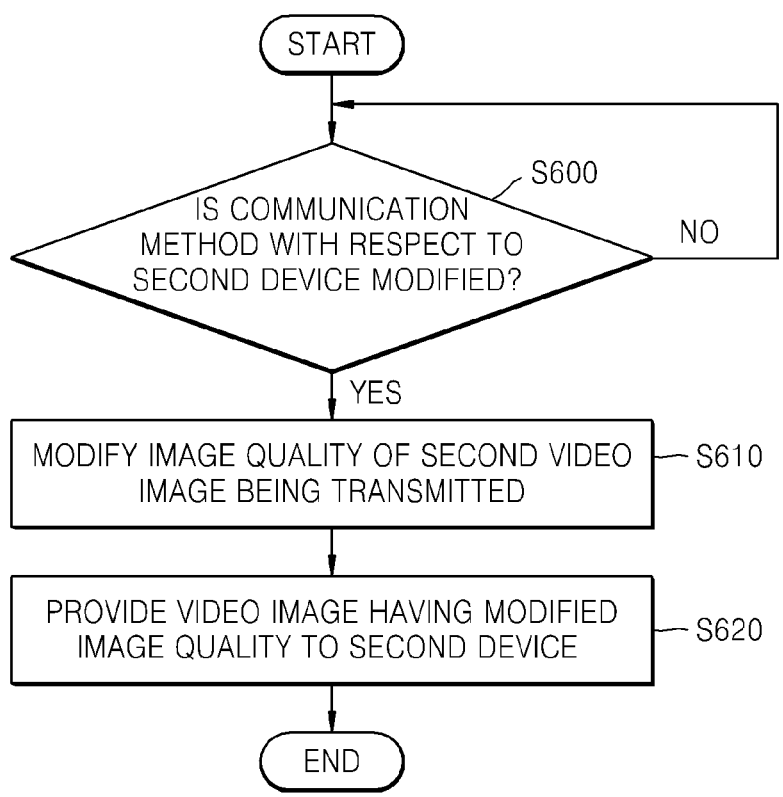
FIG. 6 is a flowchart illustrating, when a communication method between a first device and a second device is modified, a method of providing a video image having a modified image quality by the first device, to the second device, according to an exemplary embodiment.

FIG. 6 is a flowchart illustrating, when a communication method between a first device 100 and a second device 200 is modified, a method of providing a video image having a modified image quality by using the first device 100, to the second device 200, according to an exemplary embodiment.

In operation S600, the first device 100 determines whether a communication method with respect to the second device 200 is modified. In detail, the first device 100 may check whether a type or a bandwidth of a communication with respect to the second device 200 is modified. Also, the second device 200 may check whether a streaming resolution of data transmitted between the first device 100 and the second device 200 is modified.

As a result of operation S600, when it is determined that a communication method is modified, in operation S610, the first device 100 modifies an image quality of a second video image that is being transmitted to the second device 200. As the communication method between the first device 100 and the second device 200 is modified, the first device 100 may modify an image quality of the second video image to a high image quality or a low image quality.

For example, when the communication method between the first device 100 and the second device 200 is modified from 3G communication to Wi-Fi communication, the image quality of the second video image may be modified to a higher image quality than in the 3G communication. In addition, for example, when the communication method between the first device 100 and the second device 200 is modified from 4G communication to 3G communication, the image quality of the second video image may be modified to a lower image quality than in the 4G communication.

In another example, the image quality of the second video image may be modified when a streaming resolution of data transmitted between the first device 100 and the second device 200 is modified.

An image quality corresponding to at least one of a type and a bandwidth of a communication method may be set in advance and stored in the first device 100. Also, the image quality corresponding to a streaming resolution of data transmitted between the first device 100 and the second device 200 may be set in advance and stored in the first device 100.

In operation S620, the first device 100 provides a video image of a modified image quality to the second device 200. The first device 100 may provide a video image having an appropriate image quality as the modified image quality, to the second device 200.

FIG. 7 is a flowchart illustrating a method of providing a video image including an object corresponding to a portion of a video image being captured by using a first device 100, to a second device 200, according to another exemplary embodiment. Referring to FIG. 7, the first device 100 may receive coordinate information of a predetermined point of a first video image from the second device 200, and select a portion of the first video image as an area of interest by using the received coordinate information.

In operation S700, the first device 100 provides a first video image to the second device 200. The first device 100 may provide the first video image to the second device 200 based on a captured video image. The first device 100 may provide a captured video image as a first video image without processing the same, to the second device 200. Also, the first device 100 may process the captured video image, and provide the processed video image as a first video image to the second device 200. In this case, the first device 100 may modify a resolution of the captured video image or convert the captured video image into a predetermined format. For example, if the resolution of the captured video image is greater than a streaming resolution of data between the first device 100 and the second device 200, the first device 100 may modify a resolution of the captured video image to be the same as the streaming resolution of data, and may provide the captured video image at the modified resolution, as the first video image, to the second device 200.

In operation S700, the first device 100 may transmit the first video image having an original resolution to an external device at a first resolution. The first device 100 may convert the first video image having the original resolution to a first video image of a first resolution, and transmit the first video image having the first resolution, to the second device 200. In this case, the first device 100 may obtain information about a resolution of the display included in the second device 200 in advance and store the same, and may determine the first resolution based on the resolution of the display included in the second device 200.

In operation S710, the second device 200 displays the received first video image. The second device 200 may display the received first video image on a screen of the second device 200. For example, the second device 200 may display the first video image of the first resolution on the screen.

In operation S720, the second device 200 receives a touch input of the user regarding the first video image displayed on the screen. The second device 200 may receive a touch input of the user that selects a predetermined point of the first video image displayed on the screen. Also, the second device 200 may generate coordinate information of the touched point.

In operation S730, the second device 200 provides coordinate information of the touched point, to the first device 100.

In operation S740, the first device 100 determines a portion of the first video image to be provided to the second device 200, as an area of interest, based on the received coordinate information. The first device 100 may select the portion based on the position of the touched point. In detail, the first device 100 may identify an object including the touched point, and select an area that includes the identified object. For example, when a face portion is touched in the first video image, the first device 100 may identify the face, as the object including the touched point. Also, the first device 100 may select the portion including the identified face as an area of interest.

Also, the first device 100 may select an area of a previously set range around the touched point, as an area of interest. For example, the first device 100 may select a rectangular area having a predetermined size around the touched point as an area of interest.

In operation S750, the first device 100 identifies an object included in the determined portion. For example, when the first device 100 selects the area of a previously set range from the touched point as an area of interest, the first device 100 may identify the object included in the selected portion from the first video image.

The first device 100 may identify an object from the captured video image based on the determined area of interest. The determined area of interest is a portion of the first video image, and thus, the first device 100 may check an area matching to the area of interest of the first video image, from a video image that is currently being captured. Also, the first device 100 may identify an object included in the matching area from the video image that is currently being captured.

The first device 100 may identify an object included in the video image that is being captured, by using the object identified from the first video image. The first device 100 may identify an object included in a video image being captured, by using the identified object from the first video image. The first device 100 may identify an object that is similar to an image of the object identified from the first video image based on a matching/identification threshold.

In operation S760, the first device 100 tracks the identified object. The first device 100 may track the object identified from the first video image. Also, the first device 100 may track the objected identified from the captured video image.

In operation S770, the first device 100 provides a second video image including the tracked object, to the second device 200. The first device 100 may cut out a portion including the identified object from the captured video image and provide the cut portion as a second video image to the second device 200.

In detail, the first device 100 may determine a portion of a screen of the first video image having an original resolution, corresponding to an area of interest, based on the received area information. Also, the first device 100 may convert the first video image to a second video image such that only the determined portion is included in the second video image. Also, the first device 100 may provide the second video image at a first resolution to the second device 200. The first video image of the first resolution may be converted from the first video image of the original resolution. For example, when an original resolution of the first video image is 1000×1000, and the first resolution of the second video image is 100×100, the first device 100 may convert the determined portion of the first video image, to a second video image, and transmit the second video image at a 100×100 resolution, to the second device 200.

The first device 100 may determine a size of a portion corresponding to the second video image according to a communication method between the first device 100 and the second device 200. Also, the first device may determine an image quality of the second video image according to the communication method between the first device 100 and the second device 200. Examples of the communication method between the first device 100 and the second device 200 include, without limitation, 3G communication, 4G communication, and Wi-Fi communication.

As the communication method between the first device 100 and the second device 200 is modified, the first device 100 may modify a size of an area corresponding to the second video image or an image quality of the area corresponding to the second video image. The communication method between the first device 100 and the second device 200 may be modified when at least one of the first device 100 and the second device 200 performs hand over.

In operation S780, the second device 200 displays the received video image. The user of the second device 200 may check a detailed video image of the object included in the selected portion.

Meanwhile, the second device 200 may display the first video image and the second video image together on the screen of the second device 200. In this case, in operation S770, the second device 200 may receive not only the second video image but also the first video image. Also, the second device 200 may display the first and second video images by overlapping the second video image on the first video image. The second device 200 may overlap the second video image on a portion of the first video image where the user of the first device 100 is not displayed. In addition, the second device 200 may adjust a size of a portion where the first video image is displayed and a size of a portion where the second video image is displayed. However, the exemplary embodiments are not limited thereto, and the second device 200 may display the first and second video images on the screen of the second device 200 without overlapping the first and second video images.

FIGS. 8A and 8B illustrate an example of determining a portion of a first video image as an area of interest, by using a second device 200, such that an object including a point touched by a user is included in the determined portion, according to an exemplary embodiment.

Referring to FIGS. 8A and 8B, when the user touches a predetermined point 80 on the first video image displayed on a screen of the second device 200, the second device 200 may determine an area 84 including a face 82 that includes the touched point 80, as a portion of the first video image.

In detail, when the user touches the predetermined point 80 on the first video image displayed on the screen, the second device 200 may identify the face 82 including the touched point. Also, the second device 200 may select the area 84 including the face 82. In this case, a size of the area 84 may be determined based on a communication method between the first device 100 and the second device 200.

For example, when the user touches a predetermined menu displayed on the screen of the second device 200, a predetermined box is displayed on the screen of the second device 200, and the user may move the displayed box or adjust the size of the box to select an area of interest. In this case, a user interface via which the box is moved or the size of the box is adjusted may also be displayed on the screen of the second device 200.

FIGS. 9A and 9B illustrate an example of determining, as an area of interest, a portion within a previously set range from a touch point of a user, by using a second device 200, according to an exemplary embodiment.

Referring to FIGS. 9A and 9B, when the user touches a predetermined point 90 on a first video image displayed on a screen of the second device 200, a rectangular area 92 having a predetermined size around the touched point 90 may be determined as a portion of the first video image. In this case, the size of the area 92 may be determined based on a communication method between the first device 100 and the second device 200.

Alternatively, the second device 200 may determine an area of interest based on an unpinching input of the user. When the user expands a predetermined portion of a second video image by an unpinching input using, for example, his or her thumb and forefinger, and holds the touching thumb and forefinger for a predetermined period of time or longer, the second device 200 may determine the portion expanded by the unpinching input as an area of interest. Also, the second device 200 may submit a request for a second video image corresponding to the determined area of interest, to the first device 100.

FIGS. 10A and 10B illustrates an example of determining a portion of a first video image as an area of interest by using a second device 200 via a user interface for determining a portion of the first video image, according to an exemplary embodiment.

Referring to FIGS. 10A and 10B, the second device 200 may display a guide line 10 for selecting a portion of a first video image on a screen. Also, the second device 200 may modify a size of the guide line 10 based on a user touching a portion of the guide line 10 and dragging the same. Also, the second device 200 may determine a portion included in the modified guide line 10 as an area of interest of the first video image. In this case, an upper limit of the size of the portion included in the guide line 10 may be determined based on a communication method between the first device 100 and the second device 200.

Figure 11A:
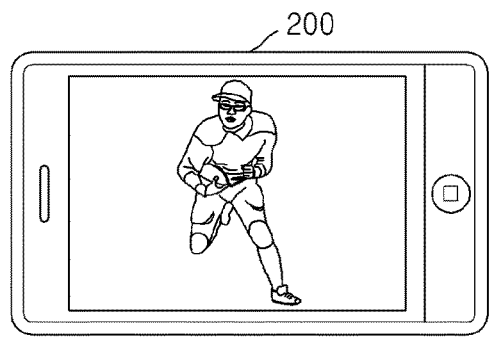
FIGS. 11A and 11B illustrate, when a communication method between a first device and a second device is modified, an example of using a second device to receive, from the first device 100, a video image at a modified resolution, according to an exemplary embodiment.
Figure 11B:
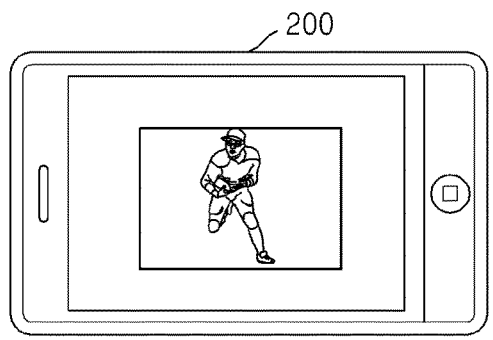

FIGS. 11A and 11B illustrate, when a communication method between a first device 100 and a second device 200 is modified, an example of using the second device 200 to receive, from the first device 100, a video image at a modified resolution, according to an exemplary embodiment. FIG. 11A illustrates a video image displayed on the second device 200 before the communication method is modified, and FIG. 11B illustrates a video image displayed on the second device 200 after the communication method is modified.

As the communication method used between the first device 100 and the second device 200 is modified, a streaming resolution of data transmitted between the first device 100 and the second device 200 may be reduced. In this case, the second device 200 may receive a video image having a lower resolution than that of a video image received before the communication method is modified, from the first device 100. Also, the second device 200 may display a video image received after the communication method is modified, with a smaller size than that of a video image received before the communication method is modified.

Figure 12A:
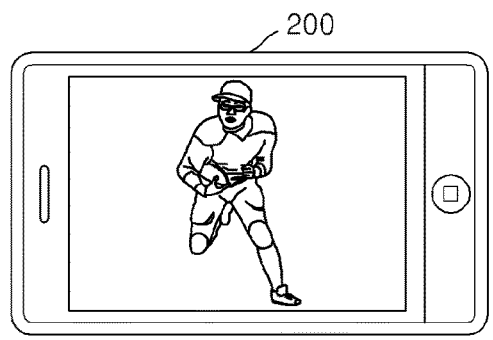
FIGS. 12A and 12B illustrate, when a communication method between a first device and a second device is modified, an example of using a second device to receive, from the first device 100, a video image with a modified image quality, according to an exemplary embodiment.
Figure 12B:
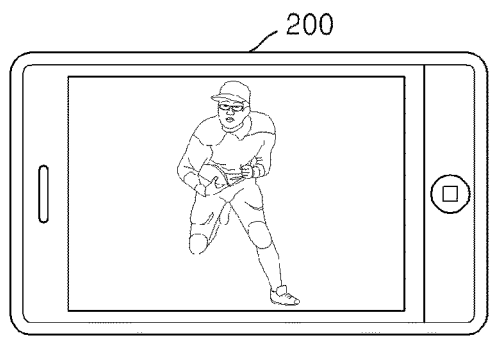

FIGS. 12A and 12B illustrate, when a communication method between a first device 100 and a second device 200 is modified, an example of using the second device 200 to receive, from the first device 100, a video image with a modified image quality, according to an exemplary embodiment. FIG. 12A illustrates a video image displayed on the second device 200 before the communication method is modified, and FIG. 12B illustrates a video image displayed on the second device 200 after the communication method is modified.

As the communication method used between the first device 100 and the second device 200 is modified, a streaming resolution of data transmitted between the first device 100 and the second device 200 may be reduced. In this case, the second device 200 may receive a video image having a lower image quality than that of a video image received before the communication method is modified, from the first device 100. Also, the second device 200 may display a video image received after the communication method is modified, with the same size as that of a video image received before the communication method is modified.

Figure 13A:
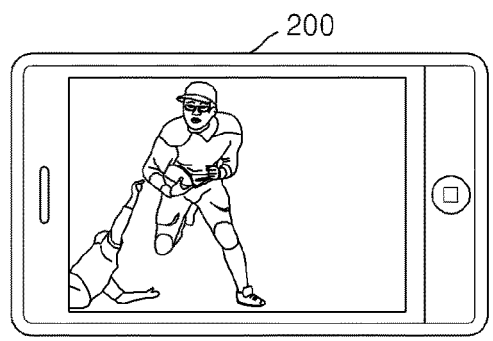
FIGS. 13A and 13B illustrate, when a communication method between a first device and a second device is modified, an example of using a second device to receive, from the first device 100, a video image with a modified portion, according to an exemplary embodiment.
Figure 13B:
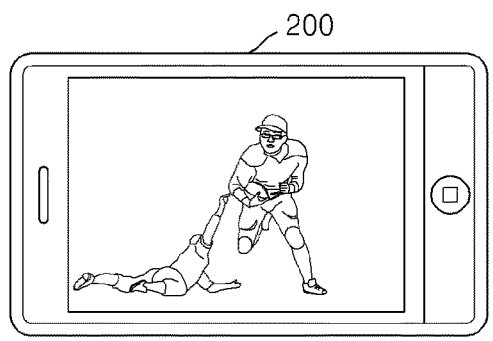

FIGS. 13A and 13B illustrate, when a communication method between a first device 100 and a second device 200 is modified, an example of using the second device 200 to receive, from the first device 100, a video image with a modified portion, according to an exemplary embodiment. FIG. 13A illustrates a video image displayed on the second device 200 before the communication method is modified, and FIG. 13B illustrates a video image displayed on the second device 200 after the communication method is modified.

As the communication method used between the first device 100 and the second device 200 is modified, a streaming resolution of data transmitted between the first device 100 and the second device 200 may be increased. In this case, the second device 200 may receive from the first device 100 a video image having a wider area than a video image received from the first device 100 before the communication method is modified.

Figure 14:
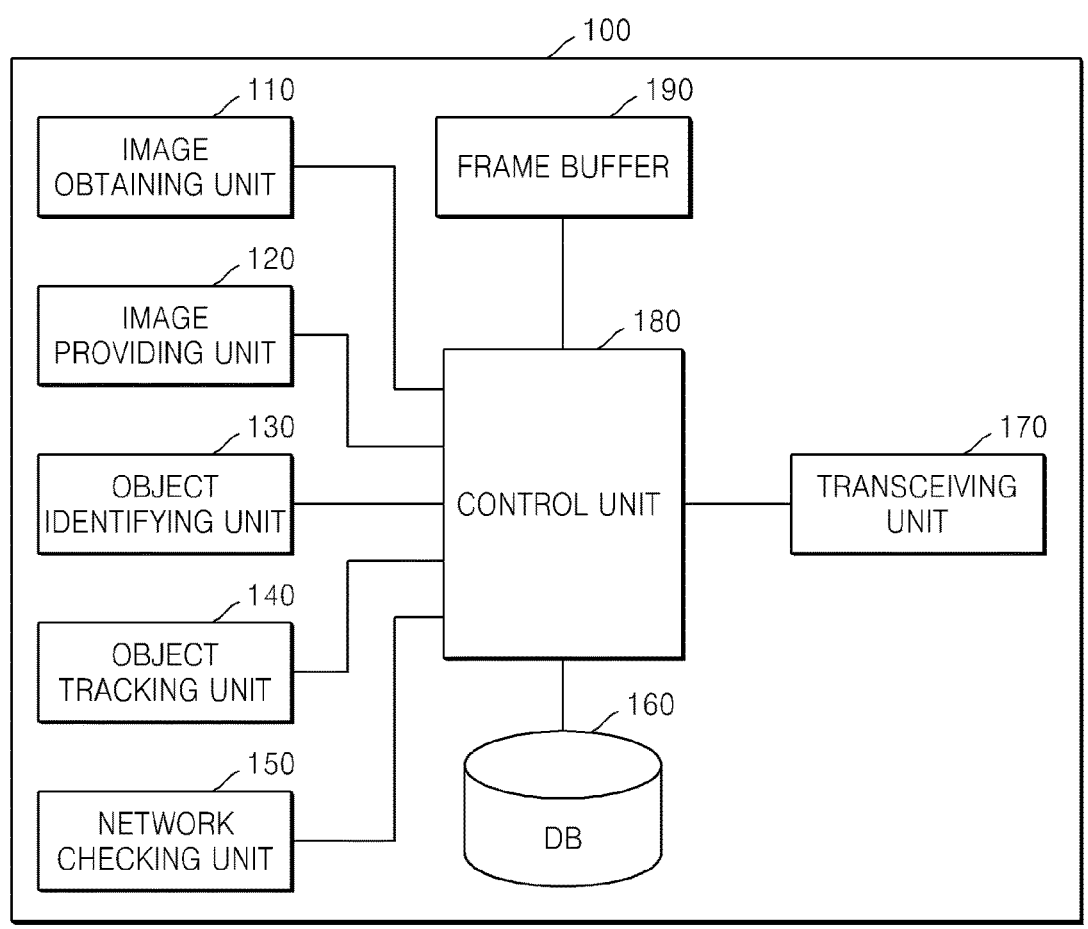
FIG. 14 is a block diagram illustrating a first device according to an exemplary embodiment.

FIG. 14 is a block diagram illustrating a first device 100 according to an exemplary embodiment.

As illustrated in FIG. 14, the first device 100 includes an image obtaining unit 110 (e.g., an image obtainer, etc.), an image providing unit 120 (e.g., an image provider, etc.), an object identifying unit 130 (e.g., an object identifier, etc.), an object tracking unit 140 (e.g., an object tracker), a network checking unit 150 (e.g., a network checker, etc.), a frame buffer 190, a database (DB) 160, a transceiving unit 170 (e.g., a transceiver, etc.), and a control unit 180 (e.g., a controller, processor, etc.).

The image obtaining unit 110 obtains an image to be provided to the second device 200. The image obtaining unit 110 may obtain a video image that is captured by using a photographing apparatus or an image sensor included the first device 100, but is not limited thereto. The image obtaining unit 110 may obtain contents such as a picture or a captured image.

When a third video image corresponding to an execution screen of an application executed in the first device 100 is provided to the second device 200, the image obtaining unit 110 may obtain the third video image corresponding to an execution screen of an application, from the frame buffer 190. However, the exemplary embodiments are not limited thereto, and the image obtaining unit 110 may extract an image corresponding to an execution screen of an application from the frame buffer 190, which will be described later, and generate a third video image by processing the extracted image.

The image providing unit 120 provides the obtained image to the second device 200. The image providing unit 120 may process the obtained image and provide the same to the second device 200, but is not limited thereto. The image providing unit 120 may provide the obtained image to the second device 200 without any additional processing.

The image providing unit 120 may provide a first video image and a second video image to the second device 200 based on a video image captured by using the first device 100. The image providing unit 120 may also provide an unprocessed captured video image to the second device 200 as a first video image. Also, the image providing unit 120 may process the captured video image and provide the processed video image to the second device 200 as a first video image. In this case, the image providing unit 120 may modify a resolution or an image quality of the captured video image or convert a format of the captured video image.

The image providing unit 120 may transmit, at a first resolution, a first video image having an original resolution, to the second device 200. The first video image of first resolution may be converted from the first video image of the original resolution. In this case, the first device 100 may obtain information about a resolution of a display included in the second device 200 in advance and store the same, and determine the first resolution based on the resolution of the display included in the second device 200.

The image providing unit 120 may provide, to the second device 200, a second video image including an object tracked by using the object tracking unit 140, which will be described later. The second video image may comprise only a portion that includes the tracked object. Also, when a communication method between the first device 100 and the second device 200 is modified, the image providing unit 120 may modify a resolution or an image quality of the second video image and provide the modified video image to the second device 200. Also, when a communication method between the first device 100 and the second device 200 is modified, the image providing unit 120 may modify a size of a portion corresponding to the second video image and provide a video image of the modified portion, to the second device 200.

Meanwhile, the image providing unit 120 may provide a third video image corresponding to an execution screen of an application executed in the first device 100, to the second device 200. Also, when the second device 200 selects a portion of the third video image received from the first device 100 and requests a video image of the selected portion, the first device 100 may provide a fourth video image corresponding to the selected portion to the second device 200. In this case, the fourth video image may be an image obtained by cutting out the selected portion from the third video image.

The object identifying unit 130 identifies an object from the obtained image. The object identifying unit 130 may receive area information of a portion of the first video image from the second device 200 and identify an object from the captured video image or the first video image.

The object tracking unit 140 tracks an object from the obtained image. The object tracking unit 140 may track the identified object from the first video image or the captured video image.

The network checking unit 150 checks a communication method between the first device 100 and the second device 200. The network checking unit 150 may check a type or a bandwidth of a communication method between the first device 100 and the second device 200. Also, the network checking unit 150 may check a streaming resolution of data transmitted between the first device 100 and the second device 200.

The frame buffer 190 stores an image corresponding to an execution screen of an application executed in the first device 100.

The DB 160 stores various types of information needed when the first device 100 provides an image of a predetermined portion of a video image to the second device 200.

The transceiving unit 170 transmits or receives, to and from the second device 200, various information needed for the first device 100 to provide an image of a predetermined portion of the first video image to the second device 200.

The control unit 180 controls the image obtaining unit 110, the image providing unit 120, the object identifying unit 130, the object tracking unit 140, the network checking unit 150, the frame buffer 190, the DB 160, and the transceiving unit 170 such that the first device 100 may provide an image of a predetermined area of a video image to the second device 200.

Figure 15:
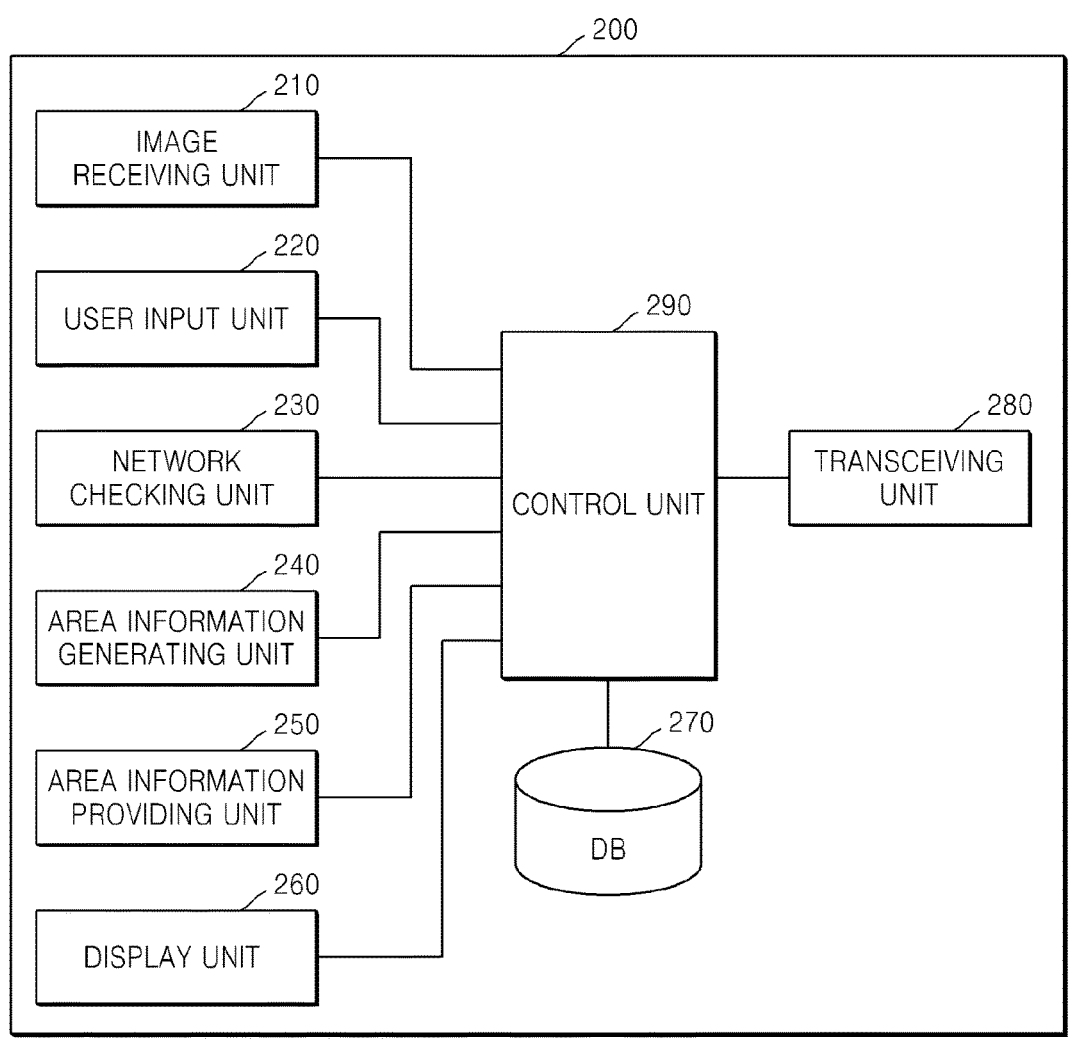
FIG. 15 is a block diagram illustrating a second device according to an exemplary embodiment.

FIG. 15 is a block diagram illustrating a second device 200 according to an exemplary embodiment.

As illustrated in FIG. 15, the second device 200 includes an image receiving unit 210 (e.g., an image receiver, etc.), a user input unit 220 (e.g., a user input, etc.), a network checking unit 230 (e.g., a network checker, etc.), an area information generating unit 240 (e.g., an area information generator, etc.), an area information providing unit 250 (e.g., an information provider, etc.), a display unit 260 (e.g., a display, etc.), a DB 270, a transceiving unit 280, and a control unit 290.

The image receiving unit 210 receives an image from the first device 100. The image receiving unit 210 may receive a first video image and a second video image from the first device 100. Also, when a communication method is modified, the image receiving unit 210 may receive a video image at a modified resolution or with a modified image quality, but the exemplary embodiments are not limited thereto.

When a third video image corresponding to an execution screen of an application executed in the first device 100 is provided, the image receiving unit 210 may receive a third video image from the first device 100.

The user input unit 220 receives a user input for selecting a portion of the first video image. For example, the user input unit 220 may receive a user input for touching a predetermined point of the first video image or a user input for touching and dragging a predetermined point of the first video image. Also, the user input unit 220 may receive a touch input of a user via a predetermined user interface displayed on a screen of the second device 200. Meanwhile, when a third video image corresponding to an execution screen of an application executed in the first device 100 is provided, the user input unit 200 receives a user input for selecting a portion of the third video image.

The network checking unit 230 checks a communication method between the first device 100 and the second device 200. The network checking unit 230 may check a type and a bandwidth of a communication method between the first device 100 and the second device 200. Also, the network checking unit 230 may check a streaming resolution of data transmitted between the first device 100 and the second device 200.

The area information generating unit 240 selects a portion of the first video image based on a user input and the checked communication method. The area generating unit 240 may generate area information related to an object included in the first video image. The area information generating unit 240 may select a portion of the first video image based on a position of a touch input point in the first video image. In detail, when the user touches a predetermined point in the first video image, the area information generating unit 240 may identify an object including a touched point and select an area including the identified object.

Also, when the user touches a predetermined point in the first video image, the area information generating unit 240 may select an area of a previously set range around the touched point as a portion of the first video image. Also, the area information generating unit 240 may modify the selected portion according to a touch input of the user via a user interface. Also, a size of the selected portion of the first video image may be determined according to a communication method between the first device 100 and the second device 200.

The area information providing unit 250 provides the generated area information to the first device 100.

The area information providing unit 250 may provide a coordinate value of the selected portion to the first device 100. Also, the area information providing unit 250 may provide a coordinate value of the touch input point input by the user to the first device 100.

The display unit 260 displays an image received from the first device 100 on a screen. The display unit 260 may display a video image received from the first device 100 on the screen.

The DB 270 stores various types of information so that the second device 200 may receive a video image of a portion of the first video image received from the first device 100.

The transceiving unit 280 transmits or receives various types of information to or from the first device 100 so that the second device 200 may receive a video image of the portion of the first video image received from the first device 100.

The control unit 290 controls the image receiving unit 210, the user input unit 220, the network checking unit 230, the area information generating unit 240, the area information providing unit 250, the display unit 260, the DB 270, the transceiving unit 280, and the control unit 290 so that the second device 200 may receive a video image of the portion of the first video image received from the first device 100.

Figure 16:
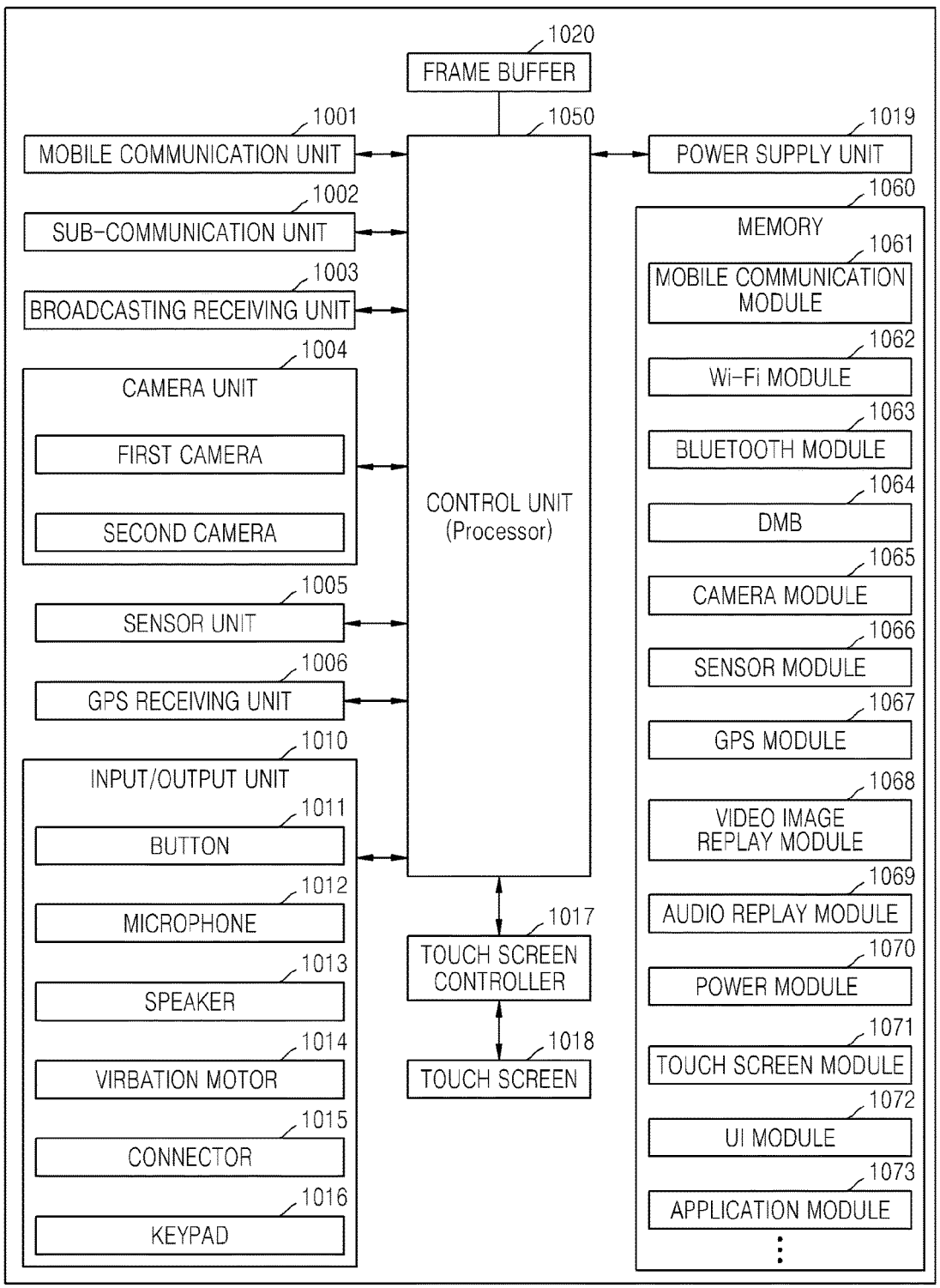
FIG. 16 is a block diagram illustrating a device according to another exemplary embodiment.

FIG. 16 is a block diagram illustrating a device according to another exemplary embodiment. The device illustrated in FIG. 16 may be the first device 100 or the second device 200 according to an exemplary embodiment.

A mobile communication unit 1001 (e.g., a mobile communicator, etc.) performs call setup with respect to a base station or data communication via a cellular network such as 3G or 4G. A sub-communication unit 1002 performs a function for short-range communication such as Bluetooth or near field communication (NFC). A broadcasting unit (e.g., a broadcast receiver, etc.) 1003 receives a digital multimedia broadcasting (DMB) signal.

A camera unit 1004 includes a lens and an optical device so as to capture a picture or a video image.

A sensor unit 1005 may include, for example, a gravitational sensor that senses motion of a device, an illumination sensor that senses luminance of light, a proximity sensor that senses proximity of a person, and a motion sensor that senses motion of a person.

A global positioning system (GPS) receiving unit 1006 receives a GPS signal from an artificial satellite. Various services may be provided to the user by using a GPS signal.

An input/output unit 1010 provides an interface with respect to an external device or a person, and may include, for example, a button 1011, a microphone 1012, a speaker 1013, a vibration motor 1014, a connector 1015, or a keypad 1016.

The touch screen 1018 receives a touch input of a user. Here, a touch input may be input by a drag gesture or a tap gesture. The touch screen controller 1017 transmits a touch input that is input via the touch screen 1018 to a control unit 1050. A power supply unit 1019 is connected to a battery or an external power source in order to supply power needed for the device.

The control unit 1050 displays a portion of contents displayed on the device and modifies the same by executing programs that are stored in a memory 1060. The control unit may write and/or read data from frame buffer 1020.

Programs stored in the memory 1060 may be classified into a plurality of modules according to functions, for example, into a mobile communication module 1061, a Wi-Fi module 1062, a Bluetooth module 1063, a DMB module 1064, a camera module 1065, a sensor module 1066, a GPS module 1067, a video image replay module 1068, an audio replay module 1069, a power module 1070, a touch screen module 1071, a user interface (UI) module 1072, or an application module 1073. The functions of the respective modules may be induced intuitively by one of ordinary skill in the art from the names of the modules.

Hereinafter, the application module 1073 will be described in detail.

First, when the device illustrated in FIG. 16 is the first device 100, the application module 1073 may provide a first video image based on a captured video image to the second device 200 by using the modules included in the first device 100, and receive area information about a portion of the first video image. Also, the application module 1073 may identify an object corresponding to the portion and track the same by using the modules included in the first device 100, and provide a second video image including the tracked object, to the second device 200. Also, the application module 1073 may check a communication method with respect to the second device 200 by using the modules included in the first device 100, and, when the communication method is modified, the application module 1073 may provide a video image at a modified resolution or image quality compared to the second video image, to the second device 200.

Also, when the device of FIG. 16 is the second device 200, the application module 1073 may receive a first video image by using modules included in the second device 200 and select a portion of the first video image. In this case, a size of the selected portion may be determined based on the communication method between the first device 100 and the second device 200. Also, the application module 1073 may generate area information about the selected portion by using the modules included in the second device 200 and provide the same to the first device 100. Also, the application module 1073 may display the received second video image from the second device 200 by using the modules included in the second device 200.

FIGS. 17A through 17C illustrate an example of expanding a portion of a first video image displayed on a screen of a second device 200 according to an exemplary embodiment.

As illustrated in FIGS. 17A through 17C, the second device 200 may expand a portion of the first video image based on a touch input and a drag input of the user. In this case, the second device 200 may determine a degree of expanding the first video image based on an original resolution of the first video image. In detail, as illustrated in FIG. 17A, when the user touches multiple portions of a screen of the first video image and makes a dragging motion across the same, a portion of the first video image may be expanded as illustrated in FIG. 17B. Also, the second device 200 may determine a degree of expanding the first video image in consideration of an original resolution of the first video image and a screen size of the second device 200. Accordingly, as illustrated in FIG. 17C, even when the user continuously touches and drags, the first video image may not be expanded more than the expanded degree as illustrated in FIG. 17B.

Also, the second device 200 may receive information about the original resolution of the first video image from the first device 100 in advance and store the same in order to determine a degree of expanding the first video image, but the exemplary embodiments are not limited thereto.

Figure 18A:
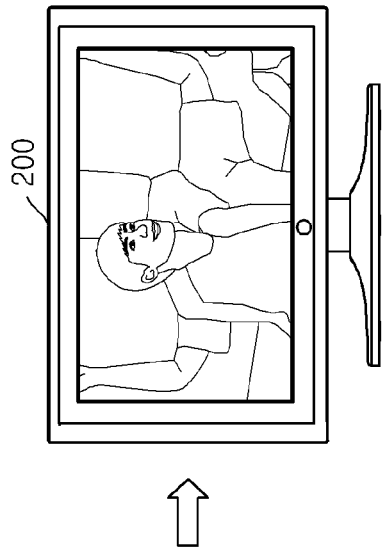
FIGS. 18A through 18C illustrate an example of expanding a portion of a video image displayed on a screen of a second device in a stepwise manner according to an exemplary embodiment.
Figure 18B:
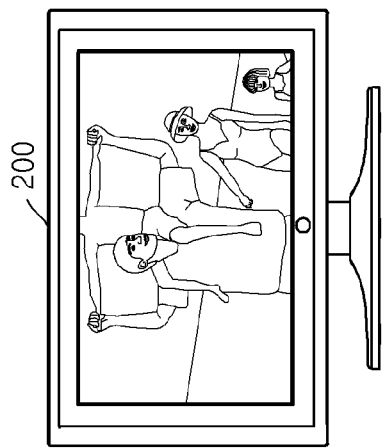
Figure 18C:
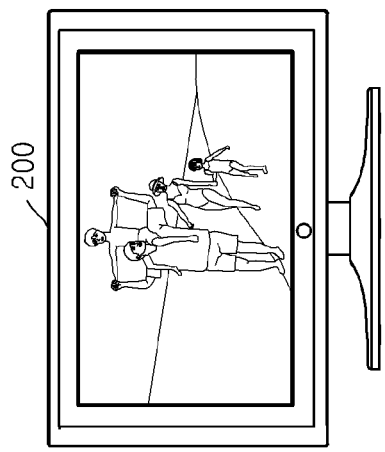

FIGS. 18A through 18C illustrate an example of expanding a portion of a video image displayed on a screen of a second device 200 in a stepwise manner according to an exemplary embodiment.

As illustrated in FIG. 18A, a portion of a video image may be selected and the selected portion may be expanded a first time, and then, a portion of the expanded portion of the video image may be selected and expanded a second time.

Figure 19A:
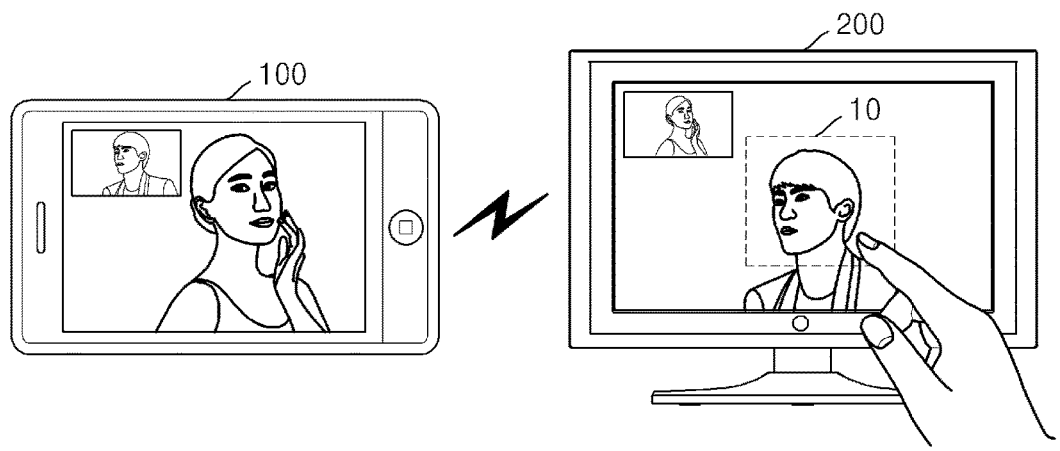
FIGS. 19A through 19C illustrate an example of displaying a preview image including an expanded portion of a first video image, on a second device, and displaying a second video image provided from a first device, on a second device, according to an exemplary embodiment.
Figure 19B:
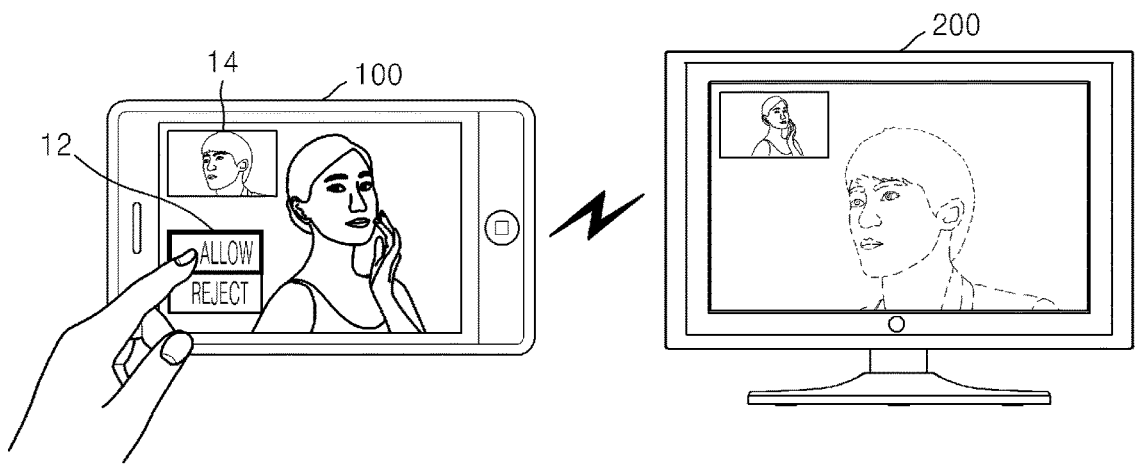
Figure 19C:
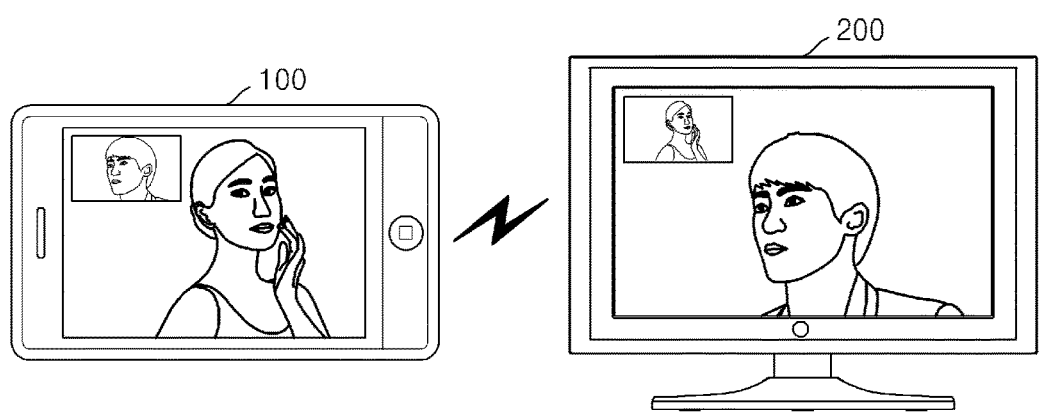

FIGS. 19A through 19C illustrate an example of displaying a preview image including an expanded portion of a first video image, on a second device 200, and displaying a second video image provided from a first device 100, on the second device 200 according to an exemplary embodiment. Here, the first device 100 and the second device 200 may make a video call with each other.

As illustrated in FIG. 19A, the user may select a portion 10 of a first video image displayed on a screen of the second device 200 as an area of interest. The second device 200 may receive a first video image having a first resolution from the first device 100 and display the received first video image on the screen of the second device 200.

Next, as illustrated in FIG. 19B, a preview image showing an expansion of the selected area of interest may be displayed on the second device 200, and a menu 12 for determining whether to expand a portion of the first video image and provide the same may be displayed on the first device 100. Also, which portion of the first video image is expanded in the second device 200 may be displayed on a predetermined area 14 of the first device 100.

When the user selects "ALLOW" on the menu 12, the first device 100 may provide a second video image of the selected area of interest to the second device 200 as illustrated in FIG. 19C and the second device 200 may display the received second video image. In this case, the first device 100 may provide a second video image of the selected area of interest having a first resolution to the second device 200.

Meanwhile, when providing the second video image to the second device 200, the first device 100 may insert notification information into the second video image to notify the second device 200 that the second video image is an expanded image of the selected area of interest. In detail, the first device 100 may stream the first video image and the second video image to the second device 200, and insert notification information into the second video image when the first device 100 stops transmitting the first video image but transmits the second video image. For example, when the first device 100 stops transmitting the first video image in order to transmit the second video image, the first device 100 may insert a predetermined parameter value into a predetermined packet at a streaming level to notify the second device 200 that the second video image is provided.

Figure 20:
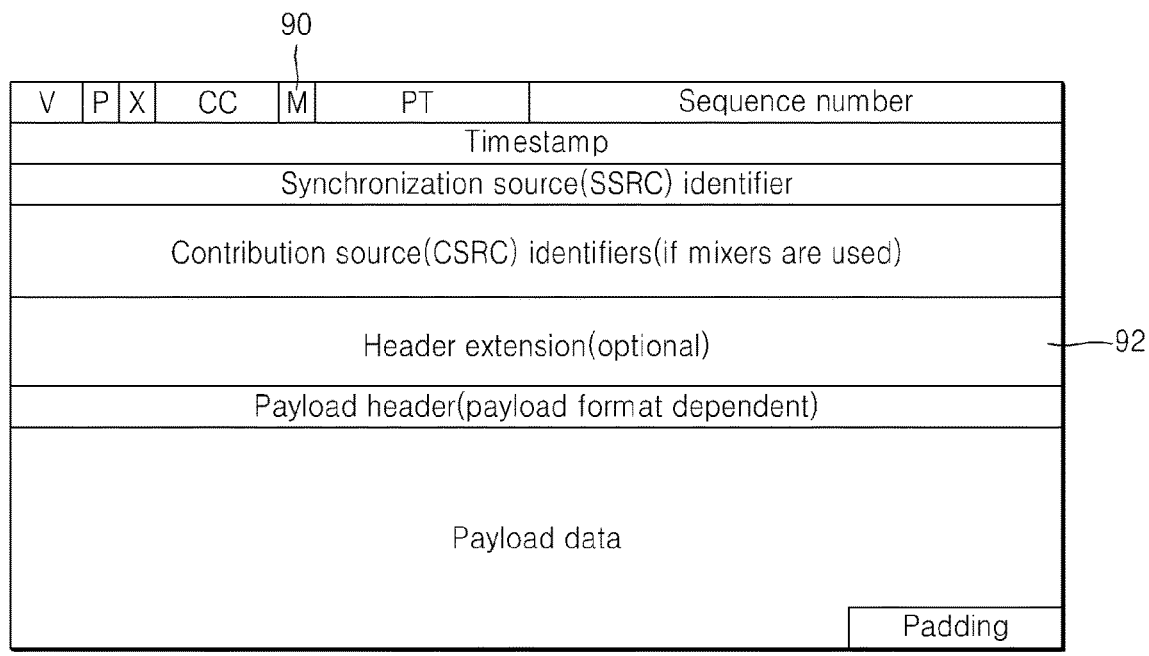
FIG. 20 illustrates an example of a real-time transfer protocol (RTP) packet header according to an exemplary embodiment.

Also, the notification information may be inserted into a real-time transfer protocol (RTP) packet header illustrated in FIG. 20. FIG. 20 illustrates an example of a RTP packet header according to an exemplary embodiment.

Each frame of the second video image provided from the first device 100 to the second device 200 may include a plurality of RTP packets. Also, the first device 100 may insert notification information into a predetermined packet of the plurality of RTP packets corresponding to each frame of the second video image. For example, the first device 100 may insert notification information into an RTP packet where a bit rate of an RTP marker field 90 included in a header of the plurality of RTP packets corresponding to each frame of the second video image is 1.

Also, the first device 100 may insert notification information into a predetermined frame from among a plurality of frames of the second video image. For example, the first device 100 may insert notification information into a predetermined number of frames, beginning from the first frame of the second video image. However, the exemplary embodiments are not limited thereto.

Also, the first device 100 may insert notification information into a header extension field 92 of an RTP packet header. The notification information may have a predetermined bit rate. Also, the notification information may include predetermined area information. The area information may be information that indicates which portion of the first video image is cut by using the first device 100 to generate the second video image. For example, the area information may be a value indicating a position of a portion from among the entire screen of an original video image, corresponding to a screen displaying the second video image. Also, the area information may have a predetermined coordinate value.

Figure 21:
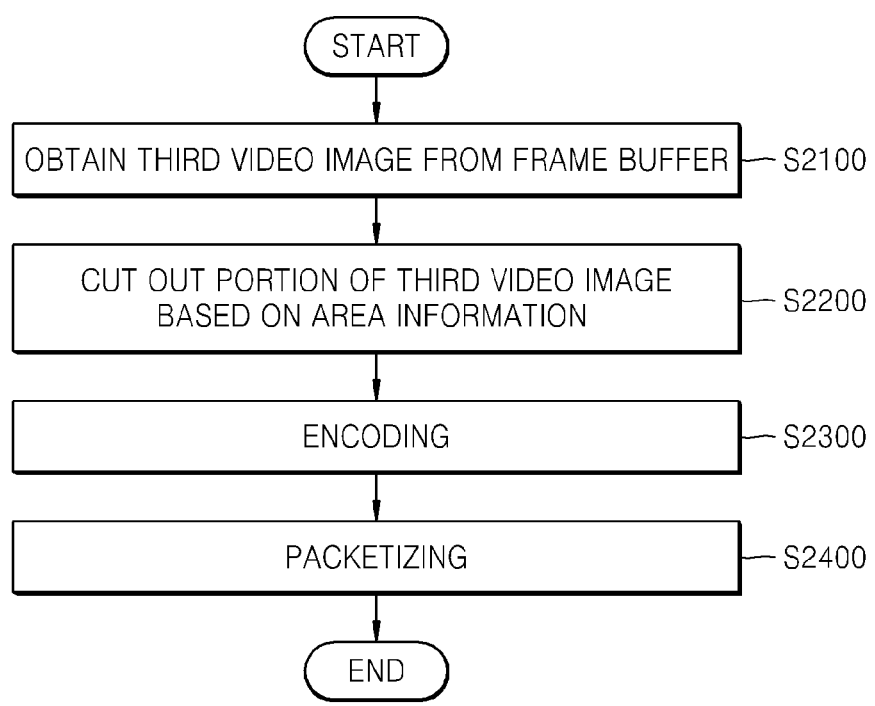
FIG. 21 is a flowchart illustrating a method of generating a fourth video image by using a first device according to an exemplary embodiment.

FIG. 21 is a flowchart illustrating a method of generating a fourth video image by using a first device 100 according to an exemplary embodiment. The first device 100 may provide a third video image corresponding to an execution screen of an application executed in the first device 100, to the second device 200, and receive area information about a portion of the third video image from the second device 200 to generate a fourth video image, and provide the generated fourth video image to the second device 200.

In operation S2100, the first device 100 obtains a third video image from a frame buffer in the first device 100. The frame buffer may store the third video image corresponding to an execution screen of an application executed in the first device 100.

In operation S2200, the first device 100 may cut out a portion of the third video image based on the area information received from the second device 200. Also, the first device 100 may encode a portion of the cut portion of the third video image in operation S2300, and packetize the same in operation S2400.

FIG. 22 is a flowchart illustrating a method of receiving, by a second device 200 that is making a video call with a first device 100, a second video image which is an expanded portion of the first video image, according to an exemplary embodiment.

In operation S2205, the first device 100 and the second device 200 are connected for a video call.

In operation S2210, the first device 100 provides a first video image to the second device 200. The first device 100 may capture a user of the first device 100, and generate a first video image for a video call. Also, the first device 100 may transmit the generated first video image to the second device 200.

In operation S2220, the second device 200 displays the first video image received from the first device 100, on a screen of the second device 200.

In operation S2230, the second device 200 selects a portion of the first video image that is to be expanded. The second device 200 may select, from the first video image, for example, a mouth portion of the user of the first device 100 or a book cover of a book that the user of the first device 100 is holding. In this case, the second device 200 may select a portion based on a touch input of the user, but the exemplary embodiments are not limited thereto. A portion to be expanded may be set in advance during a video call, and the second device 200 may select the previously set portion from the image of the user of the first device 100.

For example, the second device 200 may track a mouth portion of the user from among a face image of the user of the first device 100 to select the mouth portion of the user as a portion. In detail, the second device 200 may detect face recognition information from the image of the user of the first device 100, and may track and select the mouth portion of the face of the user of the first device 100 based on the detected face recognition information. Examples of methods of detecting the face recognition information include a feature-based method, an appearance-based method, and a hybrid method. In the feature-based method, geometrical information of a face or face feature components (e.g., eyes, nose, mouth, or chin) may be used to recognize a face based on the size and shapes of these components, correlation between the components, or information based on combination of these factors. The feature-based method may include, for example, a pure geometry method, a dynamic link architecture based method, and a hidden Markov model-based method. Also, according to the appearance-based method, a face is recognized by using a model learned from a set of learning images. Examples of the appearance-based method include a method of using eigenface generated by analyzing main components, a method using linear discriminant analysis, a method using neural networks, and a method of using a support vector machine. In addition, the hybrid method uses both the feature-based method and the appearance-based method. Examples of the hybrid method include a linear feature analysis based method, a shape-normalized based method, and a component based-method. However, the method of detecting face recognition information according to the current exemplary embodiment is not limited to the three methods described above, and other various methods may be used in detecting face recognition information.

In operation S2240, the second device 200 transmits coordinates information of the selected portion to the first device 100.

In operation S2250, the first device 100 displays the portion of the first video image selected by the second device 200. The first device 100 may display the portion of the first video image selected by the second device 200 by, for example, a dotted line. Also, the first device 100 may display only the portion of the first video image selected by the second device 200, on a screen of the first device 100.

In operation S2260, the first device 100 determines to provide a second video image with respect to the selected portion, to the second device 200. The first device 100 may display a user interface and determine to provide the second video image with respect to the portion selected by the second device 200, to the second device 200, based on a user input that is input via the user interface.

In operation 2270, the first device 100 captures a portion corresponding to the selected portion. The first device 100 may capture, for example, a mouth portion of the user of the first device 100 or a book cover of a book that the user of the first device 100 is holding.

In operation S2280, the first device 100 provides the second video image to the second device 200. The first device 100 may generate the second video image by capturing a portion corresponding to the selected portion and provide the generated second video image to the second device 200.

In operation S2290, the second device 200 displays the second video image.

Meanwhile, the second device 200 may display both the first video image and the second video image on the screen of the second device 200. In this case, in operation S2280, the second device 200 may receive not only the second video image but also the first video image. In addition, the second device 200 may display the first and second video images by overlapping the second video image on the first video image. The second device 200 may overlap the second video image on a portion of the first video image where the user of the first device 100 is not displayed. In addition, the second device 200 may adjust a size of a portion where the first video image is displayed and a size of a portion where the second video image is displayed. However, the exemplary embodiments are not limited thereto, and the second device 200 may display the first and second video images on the screen of the second device 200 without overlapping the first and second video images.

FIG. 23 is a flowchart illustrating a method of expanding a portion of a first video image and displaying the same, by a second device 200 that is making a video call with a first device 100, according to an exemplary embodiment.

In operation S2305, the first device 100 and the second device 200 are connected for a video call.

In operation S2310, the first device 100 provides a first video image to the second device 200. The first device 100 may capture a user of the first device 100, and may generate a first video image for a video call. Also, the first device 100 may transmit the generated first video image to the second device 200.

In operation S2320, the second device 200 displays the first video image received from the first device 100, on a screen of the second device 200.

In operation S2330, the second device 200 selects a portion of the first video image that is to be expanded. The second device 200 may select, from the first video image, a mouth portion of the user of the first device 100 or a book cover of a book that the user of the first device 100 is holding.

In this case, the second device 200 may select a portion based on a touch input of the user, but the exemplary embodiments are not limited thereto. A portion to be expanded may be set in advance during an image call, and the second device 200 may select the previously set portion from the image of the user of the first device 100. For example, the second device 200 may select a mouth portion of the user as a portion by tracking the mouth portion of the user of the face image of the user of the first device 100.

In operation S2340, the second device 200 displays only the portion of the first video image that is selected in operation S2330, on a screen of the second device 200. The second device 200 may expand the selected portion of the first video image by image processing, and may display the expanded portion on the screen of the second device 200. For example, when a resolution of the first video image is 200×200, and a resolution of the selected portion is 50×50, the first device 100 may expand the resolution of the selected portion to 200×200.

Meanwhile, the second device 200 may overlap the expanded image on the first video image. The second device 200 may overlap the expanded image on a portion of the first video image where the user of the first device 100 is not displayed. In addition, the second device 200 may adjust a size of a portion where the first video image is displayed and a size of a portion where the second video image is displayed. However, the exemplary embodiments are not limited thereto, and the second device 200 may display the first and second video images on the screen of the second device 200 without overlapping the first and second video images.

Figure 24A:
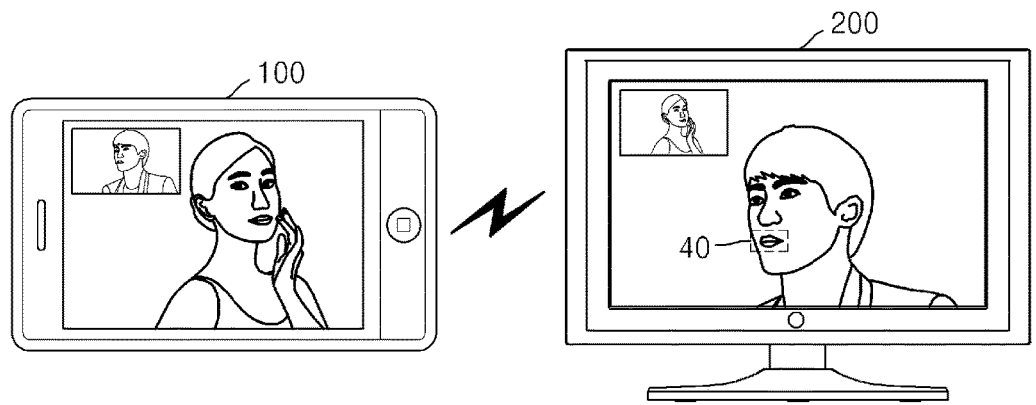
FIGS. 24A through 24C illustrate the expanded portion of the first video image displayed on a screen of a second device together with the first video image, according to an exemplary embodiment.
Figure 24B:
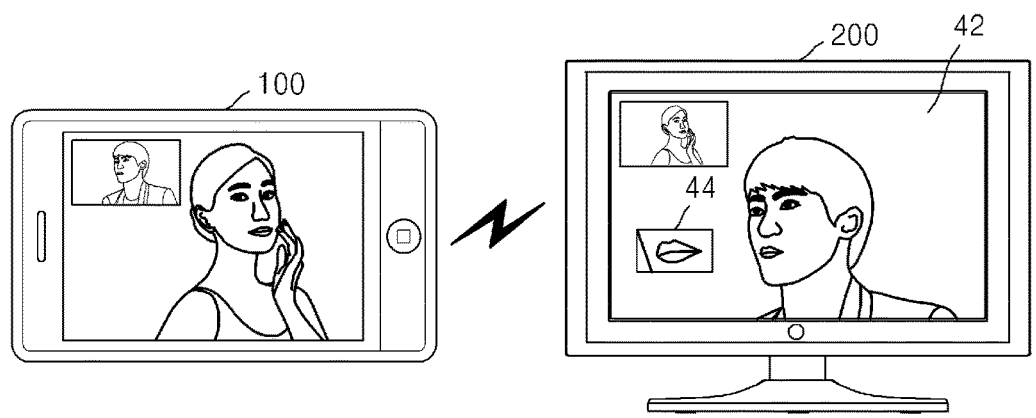
Figure 24C:
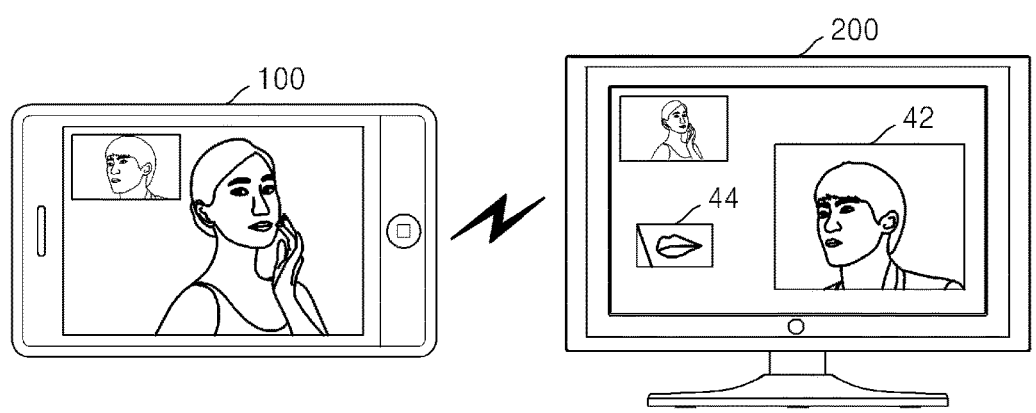

FIGS. 24A through 24C illustrate the expanded portion of a first video image 42 displayed on a screen of a second device 200 together with the first video image according to an exemplary embodiment.

Referring to FIG. 24A, a mouth portion 40 of a face of a user of a first device 100 displayed on the screen of the second device 200 may be selected. The mouth portion 40 may be selected by the user of the second device 200. However, the exemplary embodiments are not limited thereto, and the second device 200 may track and select the mouth portion 40 in the first video image 42 according to previously set standards.

Referring to FIG. 24B, an expanded image 44 of the selected mouth portion 40 may be overlapped on the first video image 42. In this case, the second device 200 may determine a portion of the first video image 42 where the user of the first device 100 is not displayed, and overlap the second video image on the portion where the user is not displayed.

In addition, referring to FIG. 24C, the expanded image 44 of the selected mouth portion 40 may not be overlapped on the first video image 42 but the expanded image 44 of the selected mouth portion 40 and the first video image 42 may be respectively displayed on separate windows.

An exemplary embodiment may also be realized in a form of a recording medium including commands executable by a computer, such as a program module executed by a computer. A computer-readable recording medium may be an arbitrary available medium accessible by a computer, and may be any one of volatile, nonvolatile, separable, and non-separable media. Also, examples of the computer-readable recording medium may include a computer storage medium and a communication medium. Examples of the computer storage medium include volatile, nonvolatile, separable, and non-separable media realized by an arbitrary method or technology for storing information about a computer-readable command, a data structure, a program module, or other data. The communication medium may include a computer-readable command, a data structure, a program module, other data of a modulated data signal, such as carrier waves, or other transmission mechanisms, and may be an arbitrary information transmission medium.

While exemplary embodiments have been particularly shown and described with reference to embodiments thereof, it will be understood by those of ordinary skill in the art that various changes in form and details may be made therein without departing from the spirit and scope of the inventive concept as defined by the appended claims. The exemplary embodiments should be considered in a descriptive sense only and not for purposes of limitation. For example, each element described as a single type may be distributed, and similarly, elements described to be distributed may be combined.

The scope of the exemplary embodiments is defined not by the detailed description but by the appended claims, and all differences within the scope will be construed as being included in the inventive concept.

What is claimed is:

1. An image providing method, comprising:
transmitting, to an external device, a first video image of a first resolution;
receiving, from the external device, area information about a portion area of the first video image, wherein the portion area is a portion of the first video image of the first resolution, wherein the portion area includes an object displayed in the first video image, and the area information is generated by the external device;
determining, based on the area information, an area corresponding to the portion area, of the first video image;
generating a second video image of the first resolution which represents the determined area of the first video image; and
transmitting the second video image to the external device.

2. The image providing method of claim 1, wherein the first resolution of the second video image is greater than a resolution of the portion area of the first video image.

3. The image providing method of claim 1, wherein the portion area is selected by the external device.

4. The image providing method of claim 1, wherein when a screen of the external device is touched at a point, the portion area is determined to include the object corresponding to the touched point of the screen.

5. The image providing method of claim 1, wherein the determining comprises determining the area including an object in the portion area.

6. The image providing method of claim 5, wherein the determining comprises tracing the object in the portion area, and determining the area including the traced object.

7. The image providing method of claim 1, wherein the first video image and the second video image are video images for a video call with the external device, and
wherein in the transmitting the first video image to the external device, the first video image is transmitted to the external device based on a video image captured by a camera.

8. The image providing method of claim 7, wherein a resolution of the video image captured by the camera is greater than the first resolution of the video call.

9. The image providing method of claim 1, wherein a range of the determined area is determined according to a type of a communication method used to communicate with the external device.

10. A device for providing a video image, comprising:
a communication interface configured to transmit, to an external device, a first video image of a first resolution, and receive, from the external device, area information about a portion area of the first video image, wherein the portion area is a portion of the first video image of the first resolution; and
a processor configured to determine an area corresponding to the portion area of the first video image based on the area information, generate a second video image of the first resolution which represents the determined area of the first video image, and provide the second video image to the external device,
wherein the portion area includes an object displayed in the first video image, and the area information is generated by the external device.

11. The device of claim 10, wherein the first resolution of the second video image is greater than a resolution of the portion area of the first video image.

12. The device of claim 10, wherein the portion area is selected by the external device.

13. The device of claim 10, wherein the processor is configured to determine the area including an object in the portion area.

14. The device of claim 13, wherein the processor is configured to trace the object in the portion area, and determine the area including the traced object.

15. The device of claim 10, wherein the first video image and the second video image are video images for a video call with the external device, and
wherein the processor is configured to provide the first video image to the external device based on a video image captured by a camera.

16. The device of claim 15, wherein a resolution of the video image captured by the camera is greater than the first resolution of the video call.

17. The device of claim 10, wherein a range of the determined area is determined according to a type of a communication method used to communicate with the external device.

18. A non-transitory computer-readable recording medium having recorded thereon a program for causing a computer included in a first device to execute the method of:
transmitting, to an external device, a first video image of a first resolution;
receiving, from the external device, area information about a portion area of the first video image, wherein the portion area is a portion of the first video image of the first resolution, wherein the portion area includes an object displayed in the first video image, and the area information is generated by the external device;
determining, based on the area information, an area corresponding to the portion area, of the first video image;
generating a second video image of the first resolution which represents the determined area of the first video image; and
transmitting the second video image to the external device.

* * * * *